(12) United States Patent
Mitlin

(10) Patent No.: US 7,058,137 B2
(45) Date of Patent: Jun. 6, 2006

(54) PHASE SHIFTERS FOR PEAK-TO-AVERAGE POWER RATIO REDUCTION IN MULTI-CARRIER COMMUNICATION SYSTEMS

(75) Inventor: Vlad Mitlin, 10329 Azuaga St., 263, San Diego, CA (US) 92129

(73) Assignee: Vlad Mitlin, San Diego ( * ) Notice: Subject to any disclaimer, the term of this patent is extended or adjusted under 35 U.S.C. 154(b) by 0 days.

(21) Appl. No.: 10/945,974

(22) Filed: Sep. 22, 2004

(65) Prior Publication Data

US 2006/0062280 A1  Mar. 23, 2006

(51) Int. Cl.
*H04L 27/20* (2006.01)
*H04L 27/22* (2006.01)
*H04J 11/00* (2006.01)

(52) U.S. Cl. .............. 375/295; 375/316; 370/210
(58) Field of Classification Search ............... 375/295, 375/316, 219, 260, 261, 271, 298, 130, 270, 375/139; 370/210, 203, 206–208, 295, 281, 370/277, 343, 516, 518
See application file for complete search history.

(56) References Cited

U.S. PATENT DOCUMENTS

| | | | | |
|---|---|---|---|---|
| 5,838,732 | A * | 11/1998 | Carney | 375/297 |
| 6,424,681 | B1 * | 7/2002 | Tellado et al. | 375/296 |
| 6,445,747 | B1 | 9/2002 | Jafarkhani et al. | |
| 6,512,797 | B1 * | 1/2003 | Tellado et al. | 375/261 |
| 6,757,299 | B1 * | 6/2004 | Verma | 370/482 |
| 6,950,389 | B1 * | 9/2005 | Weerackody | 370/210 |
| 2001/0022777 | A1 * | 9/2001 | Bourget et al. | 370/210 |
| 2003/0218973 | A1 * | 11/2003 | Oprea et al. | 370/210 |
| 2003/0231581 | A1 * | 12/2003 | Son | 370/208 |
| 2004/0058701 | A1 * | 3/2004 | Jung et al. | 455/522 |
| 2004/0146115 | A1 * | 7/2004 | Feng et al. | 375/260 |

OTHER PUBLICATIONS

Tarokh et al. "On the Computation and Reduction of the Peak-to-Average Power Ratio in Multicarrier Communications", Jan. 2000, IEEE Transactions on Communications, vol. 48, No. 1, pp. 37-44.*

Simlin, D.R. and Patisaul, C.R. "On Minimising the Peak-to-Average Power Ratio for the Sum of NSinusoids", IEEE Transactions on Communications, vol. 41, No. 4, Apr. 1993, p. 631-635.

Katz, N.M., "Gauss Sums, Kloosterman Sums, and Monodromy Groups", Princeton, NJ: Princeton University Press, 1987.

(Continued)

*Primary Examiner*—Tesfaldet Bocure
*Assistant Examiner*—Vineeta Panwalkar

(57) ABSTRACT

In accordance with the present invention, there are provided peak-to-average power ratio optimal phase shifters for multi-carrier communications. An optimal shifter is shown to be a complex, constant envelope sequence mapped by a multi-tone transformation used to another complex, constant envelope sequence. In the case of the inverse discrete Fourier transform being the multi-tone transformation, a family of principal shifters of the form $z(r)=\exp(\pm j*\pi*p*r^2/q)$, where $j^2=-1$, $0 \leq r < q$, q is a number of subcarriers, and p and q are mutually prime integers of different parity, has been analytically constructed. These phase shifters outperform the best existing phase shifter by as much as 2.6 dB.

3 Claims, 38 Drawing Sheets

OTHER PUBLICATIONS

Newman, D.J., "An L1 Extremal Problem for Polynomials," Proc. Amer. Math. Soc., vol. 16 p. 1287-1290, Dec. 1965.

Proakis, J.G., "Digital Communications," McGraw-Hill, New York, 1995.

Shlien, S., "Minimization of the Peak Amplitude of a Waveform," Signal Processing, vol. 14, p. 91-93, 1998.

* cited by examiner

PHASE SHIFTERS FOR PEAK-TO-AVERAGE POWER RATIO REDUCTION IN MULTI-CARRIER COMMUNICATION SYSTEMS

FIELD OF THE INVENTION

The present invention relates to reducing the peak-to-average power ratio (PAPR) in multi-carrier communication systems and, more particularly, to designing PAPR-optimal phase shifters for multi-carrier communication systems.

BACKGROUND OF THE INVENTION

One of the important problems inherent in multi-carrier communication systems is a need to control and ultimately, to reduce the value of the peak-to-average power ratio (PAPR). Undesirably high amplitude values of the transmitted signal are typically caused by the closeness of phases of the components of input of the multi-tone transformation module (usually, the inverse discrete Fourier transform (IDFT)) of the transmitter. The solution to this problem should comprise a phase shifter that scrambles the data before they are converted into the transmitted broadband signal (e.g., OFDM or DMT symbol in commonly used multi-carrier systems). At the receiver, a phase deshifter should be applied accordingly. Gimlin and Patisaul (1993) consider the problem of phasing several equal-amplitude sinusoids and describe an optimal phase shifter that is due to Newman (1965). A similar phase shifter for a multi-carrier wireless communication system is described by Carney (1998). Another possible solution was proposed by May (1998) comprising an adaptive training of a communication system to reduce PAPR. Work on developing optimized phase shifters was also performed by Jafarkhani and Tarokh (2002).

Existing solutions usually comprise an "ultimate" phase shifter, i.e. a unique sequence that can be hard-coded. It is important to attain a general understanding of the structure of optimal phase shifters regardless of the specifics of the multi-tone transformation used. It is also important to develop an analytical foundation for easily generating such phase shifters for specific parameters of the multi-tone transformation.

SUMMARY OF THE INVENTION

In accordance with the present invention, there are provided PAPR-optimal phase shifters for multi-carrier communications. An optimal shifter is shown to be a complex, constant envelope sequence mapped by the multi-tone transformation used to another complex, constant envelope sequence. In the case of IDFT being the multi-tone transformation, a family of principal shifters of the form $z(r) = \exp(\pm j^*\pi^*p^*r^2/q)$, where $j^2 = -1$, $0 \leq r < q$, $q$ is a number of subcarriers, and $p$ and $q$ are mutually prime integers of different parity, has been analytically constructed. These phase shifters outperform the best existing phase shifter by as much as 2.6 dB.

BRIEF DESCRIPTION OF THE DRAWINGS

A complete understanding of the present invention may be obtained by reference to the accompanying drawings, when considered in conjunction with the subsequent, detailed description, in which:

FIG. 4 presents values of the function f(r) shown in FIG. 3.

For purposes of clarity and brevity, like elements and components will bear the same designations and numbering throughout the FIGURES.

DESCRIPTION OF THE PREFERRED EMBODIMENT

In the following description, numerous specific details are set forth in order to provide a thorough understanding of the present invention. It will be obvious to one skilled in the art that the present invention may be practiced without these specific details. In other instances, well-known circuits, structures and techniques have not been shown in detail in order not to unnecessarily obscure the present invention.

Figure 1:
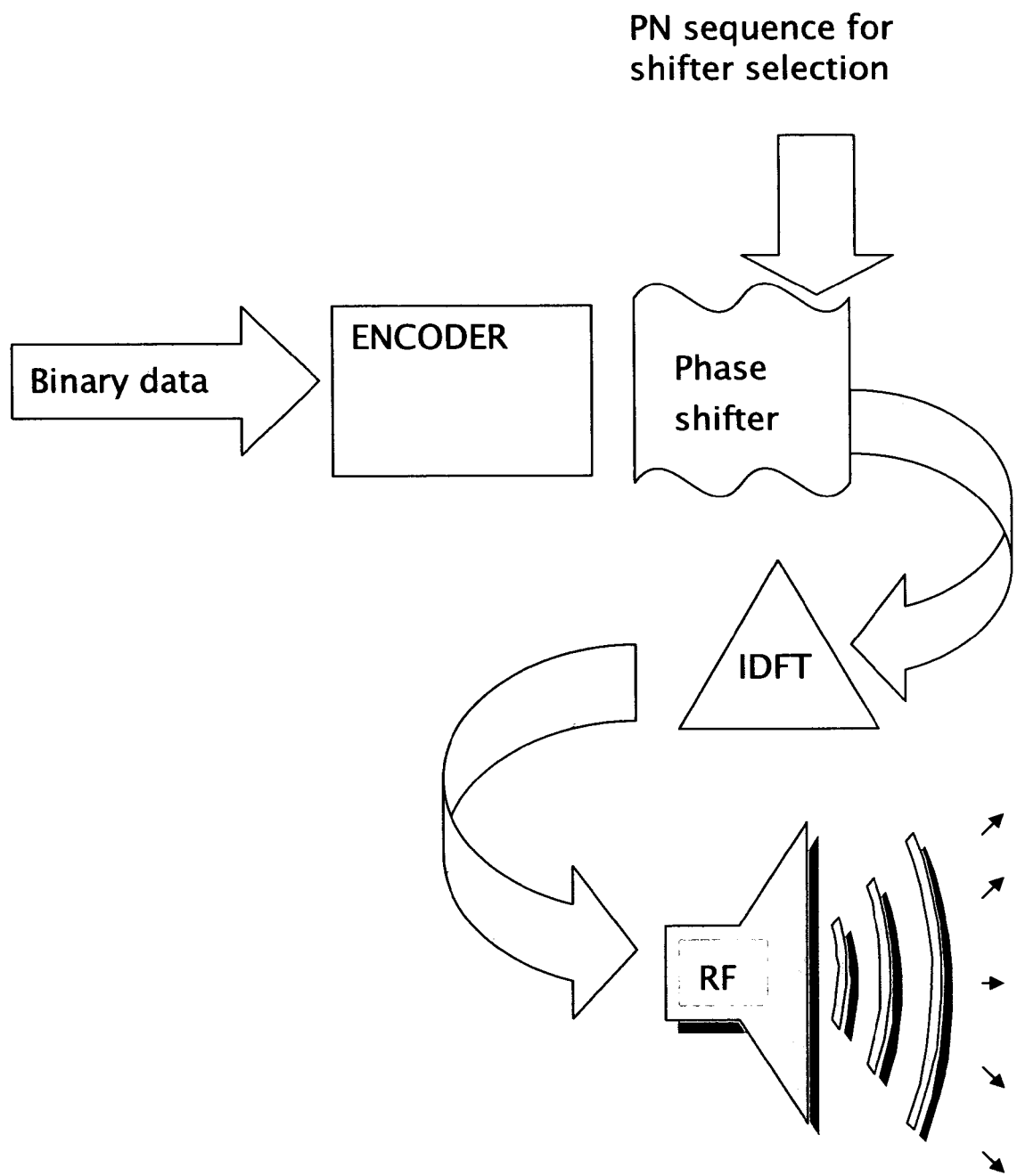
FIG. 1 is an outline of the transmitter of a multi-carrier communication system.
Figure 2:
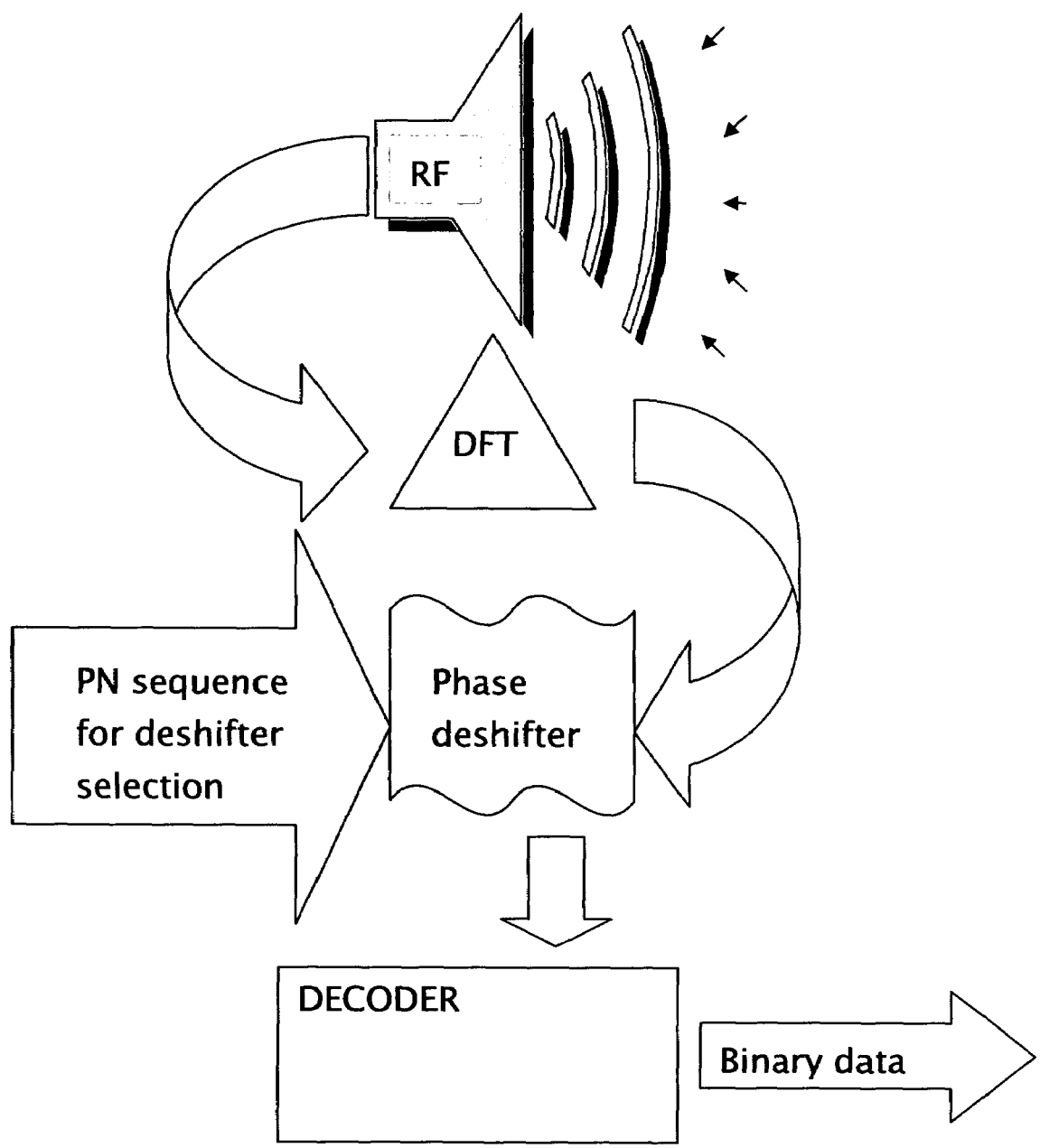
FIG. 2 is an outline of the receiver of a multi-carrier communication system.

FIGS. 1 and 2 show an outline of the multi-carrier system relevant to our study. The system comprises a transmitter (FIG. 1) and a receiver (FIG. 2). The transmitter includes an encoder module, a phase shifter module, an IDFT (inverse discrete Fourier transform) module, and a front end (RF) module. The receiver includes a front end (RF) module, a DFT (discrete Fourier transform) module, a phase deshifter module, and a decoder module. The encoder/decoder modules include, at least, q constellation encoders/decoders where q is the number of subcarriers. The encoder/decoder modules may also include a channel encoder/decoder; however, this feature is irrelevant to further consideration and will not be discussed below. The purpose of PN sequences in FIGS. 1 and 2 will be explained later. Optimizing the phase shifter/deshifter modules is the main purpose of this invention.

Theory of the Method

At time intervals of a predetermined duration, a block of binary data enters the encoder module at the transmitter. The output of this module is a sequence a of symbols that are convenient to present as complex numbers with values in the range defined by the specific structure of the encoder. This sequence is an input to the multi-tone transformation module. The output of this module is a baseband signal to be transmitted. It enters the RF module where it is upconverted and transmitted over the channel. The received signal is downconverted in the RF module; processed through the inverse multi-tone transformation module; deshifted; and finally decoded.

It can be assumed, with no loss of generality, that the multi-tone transformation is IDFT. The sequence a is transformed by the IDFT module, as follows:

$$\vec{y} = G\vec{a}, \quad G = HB, \tag{1}$$

$$\vec{y} = \{y_n\}, \quad \vec{a} = \{a_n\}, \quad B = \{\delta_{nr}b_n\}, \quad H = \{h_{nr}\}, \quad n, r = 0, \ldots, q-1$$

In Eq. (1) B is a diagonal phase shifter matrix; $\delta_{nr}$ is the Kronecker symbol; H is the IDFT matrix; and y is the output of the IDFT module. Using Eq. (1) the PAPR of the output sequence y is defined as follows:

$$PAPR = \frac{q\max_n |y_n|^2}{\sum_{n=0}^{q-1} |y_n|^2} = \frac{q\max_n \left|\sum_{r=0}^{q-1} h_{nr} b_r a_r\right|^2}{\sum_{n=0}^{q-1} \left|\sum_{r=0}^{q-1} h_{nr} b_r a_r\right|^2} \tag{2}$$

A standard approach to evaluating PAPR in Eq. (2) is using a worst case data sequence a=x. Usually this sequence is chosen so that its components are the same. As the PAPR functional in Eq. (2) is homogenous with respect to a, it can be assumed, without loss of generality, that all components of x are 1. This choice of x is natural, as the Fourier transform of a constant is the delta function that has the largest PAPR. This means that:

$$\vec{x} = \vec{1} \Rightarrow (\vec{1}, \vec{z}): \tag{3}$$

$$PAPR(\vec{x}, \vec{z}) = \min_{\vec{b}} PAPR(\vec{x}, \vec{b}) =$$

$$\min_{\vec{b}} \frac{q\max_n \left|\sum_{r=0}^{q-1} h_{nr} b_r x_r\right|^2}{\sum_{n=0}^{q-1} \left|\sum_{r=0}^{q-1} h_{nr} b_r x_r\right|^2} = \min_{\vec{b}} \frac{q\max_n \left|\sum_{r=0}^{q-1} h_{nr} b_r\right|^2}{\sum_{n=0}^{q-1} \left|\sum_{r=0}^{q-1} h_{nr} b_r\right|^2} = 1$$

Eq. (3) shows that PAPR is minimized, for x=1, at the sequence b=z whose components have the same absolute value (by the definition of a shifter sequence) and whose multi-tone transformation has all components of the same absolute value as well. The sequence z is termed a principal shifter.

This result can be generalized by considering a wider class of worst case sequences with components having the same absolute value but possibly different phases. It follows from Eq. (3) that in order to minimize the PAPR the product of each component of a worst case sequence and of the corresponding shifter sequence should be equal to the corresponding component of the principal shifter sequence:

$$|\vec{x}|=1 \Rightarrow (\vec{x}, \vec{b}): b_r x_r = z_r, r=0, \ldots, q-1 \quad (4)$$

Again, the principal shifter is a complex sequence of constant envelope $$\vec{z} = \{\exp(2j\pi f(r)/q)\}, r=0, \ldots, q-1, j^2=-1 \quad (5)$$

mapped by the multi-tone transformation to another complex sequence of constant envelope. It follows from Eq. (5) that the principal shifter is defined by its normalized phase $f(r)$, a real-valued function such that $0 < f(r) \leq q$.

It follows from Eq. (4) that considering worst case sequences with components having different absolute values is not reasonable, as it results in different absolute values of the components of the shifter sequence which, in turn, yields variations in the signal power.

Figure 3:
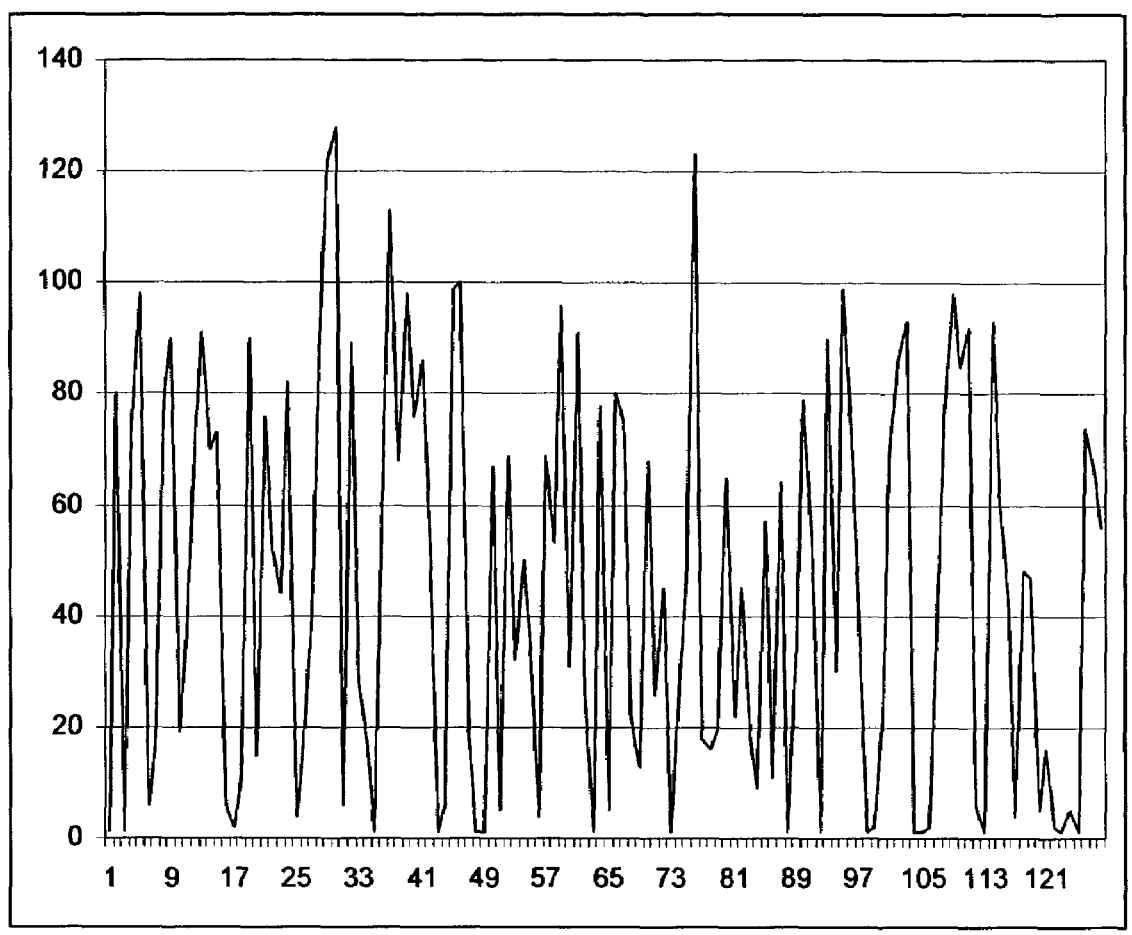
FIG. 3 is a normalized phase function f(r) of a principal shifter obtained in numerical simulations for 128-carrier system.
Figure 5:
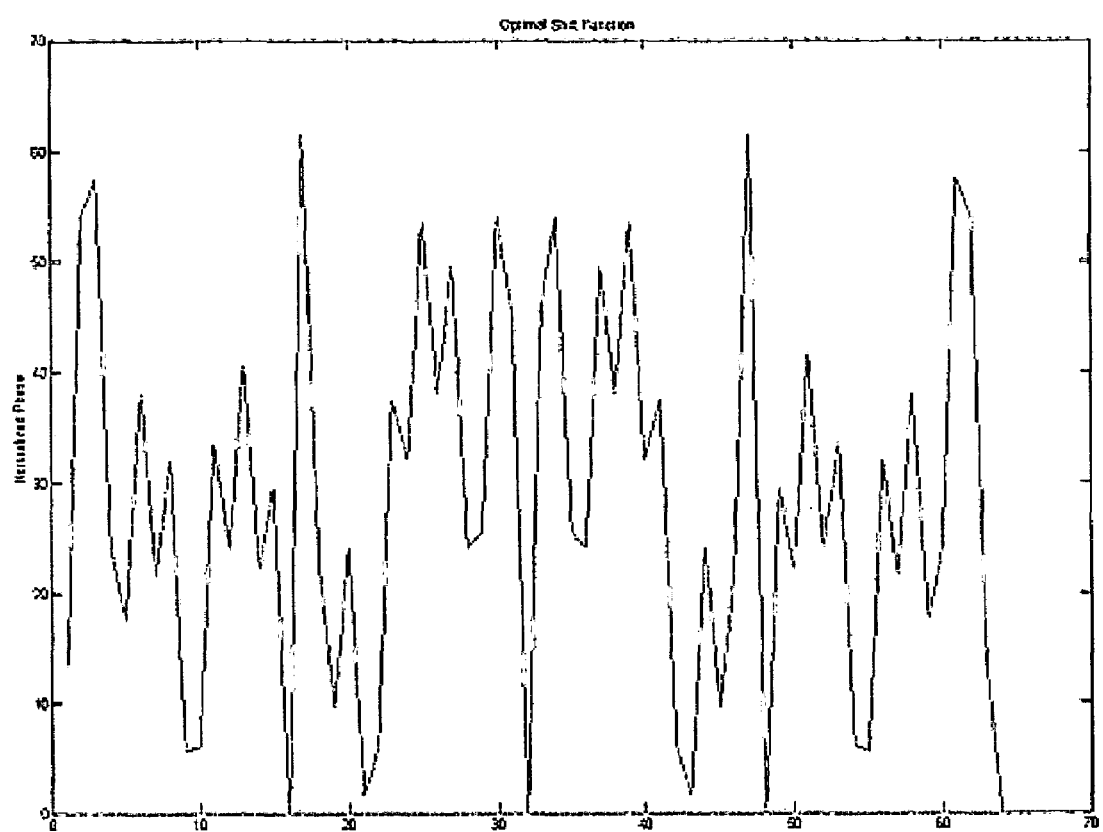
FIG. 5 is f(r) of a flat spectrum chirp at q=64 and p=27.
Figure 6:
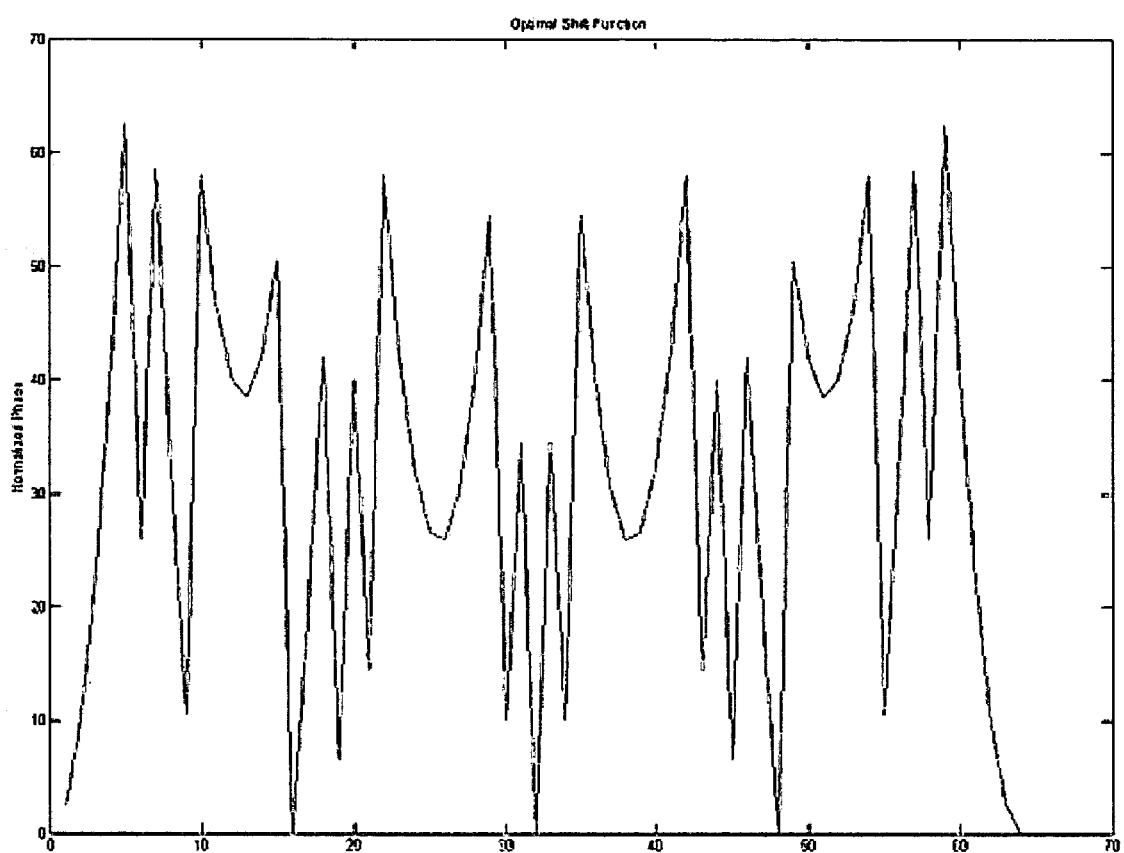
FIG. 6 is f(r) of a flat spectrum chirp at q=64 and p=5.
Figure 7:
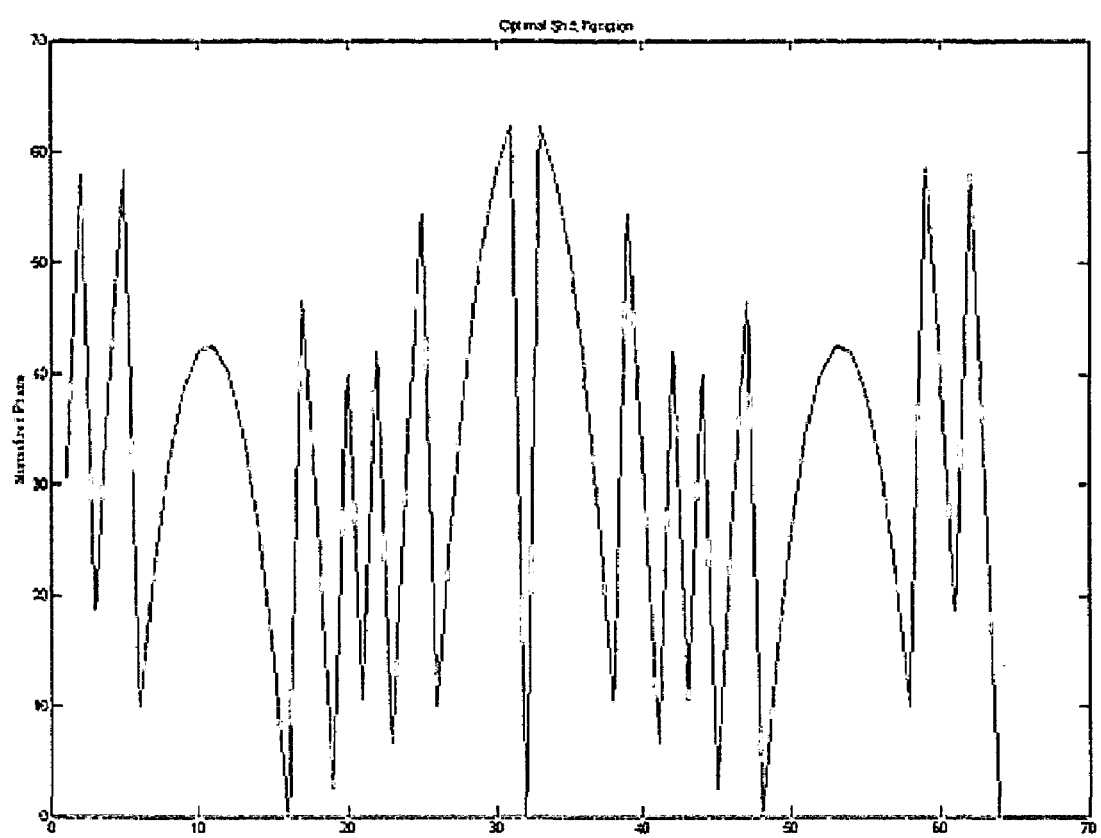
FIG. 7 is f(r) of a flat spectrum chirp at q=64 and p=61.
Figure 8:
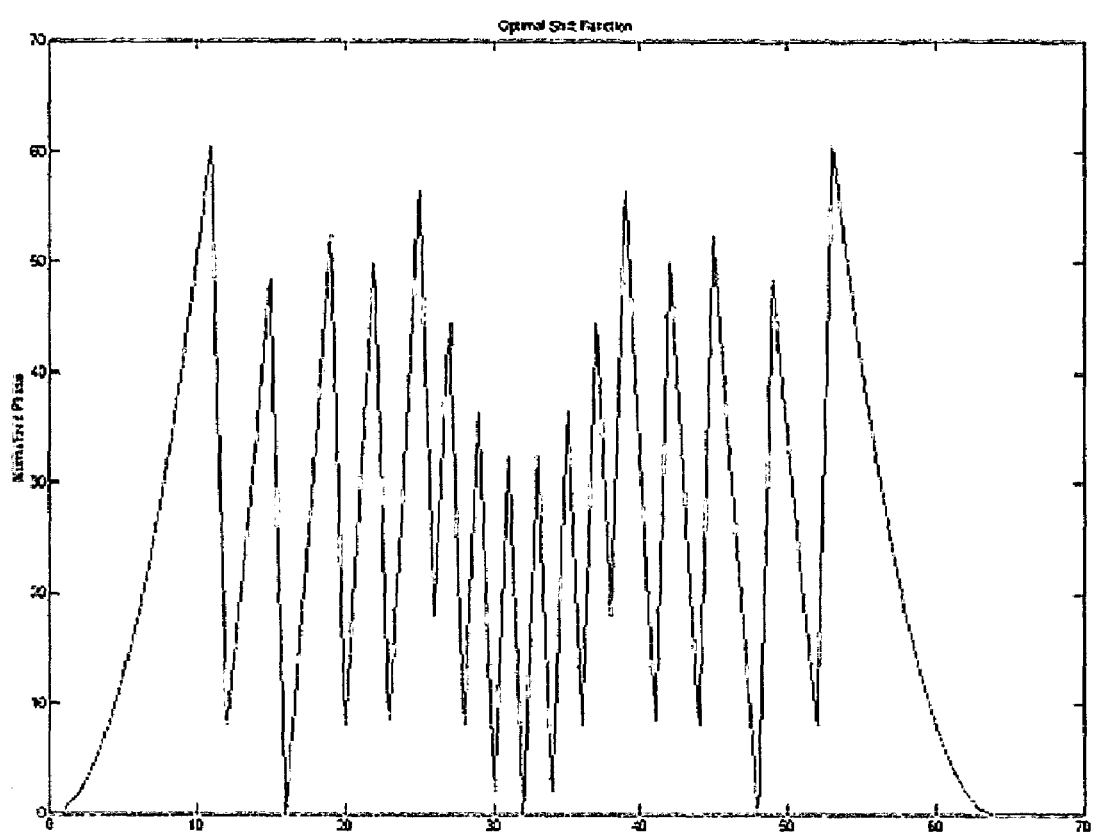
FIG. 8 is f(r) of a flat spectrum chirp at q=64 and p=1.
Figure 9:
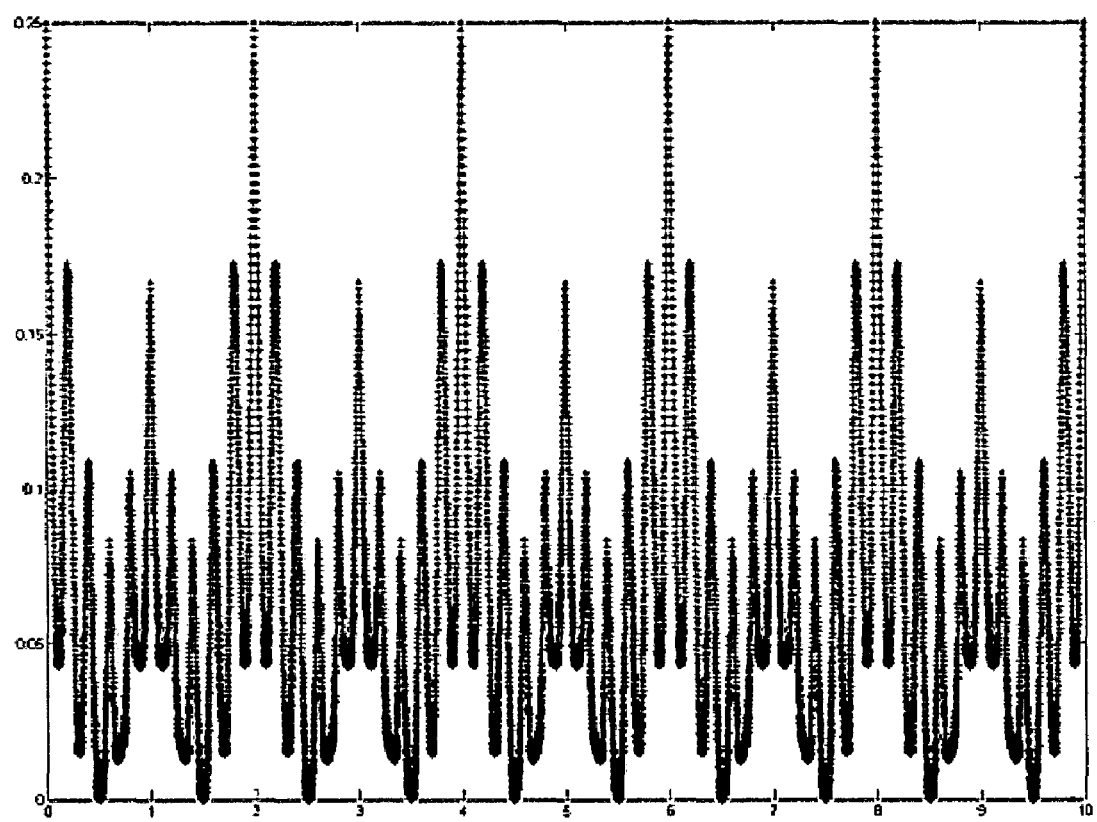
FIG. 9 is the p/2 dependence of the variance of the amplitude of DFT of a chirp at q=4.
Figure 10:
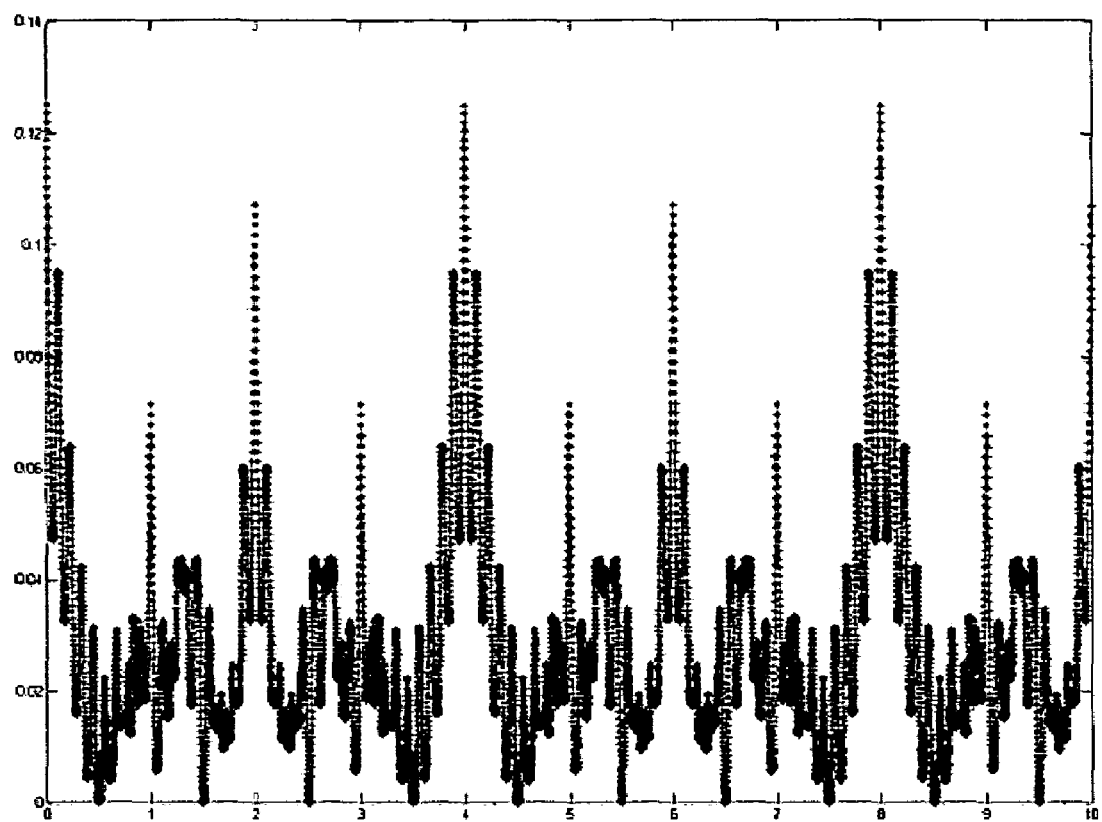
FIG. 10 is the p/2 dependence of the variance of the amplitude of DFT of a chirp at q=8.
Figure 11:
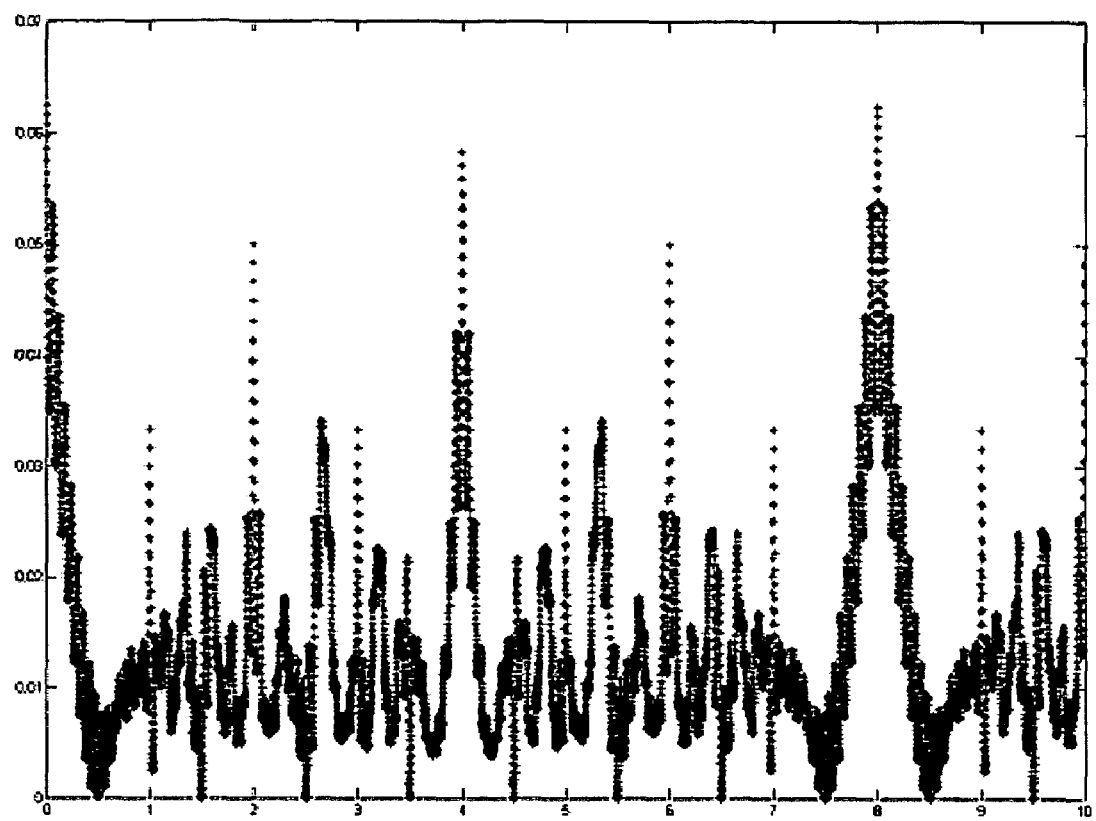
FIG. 11 is the p/2 dependence of the variance of the amplitude of DFT of a chirp at q=16.
Figure 12:
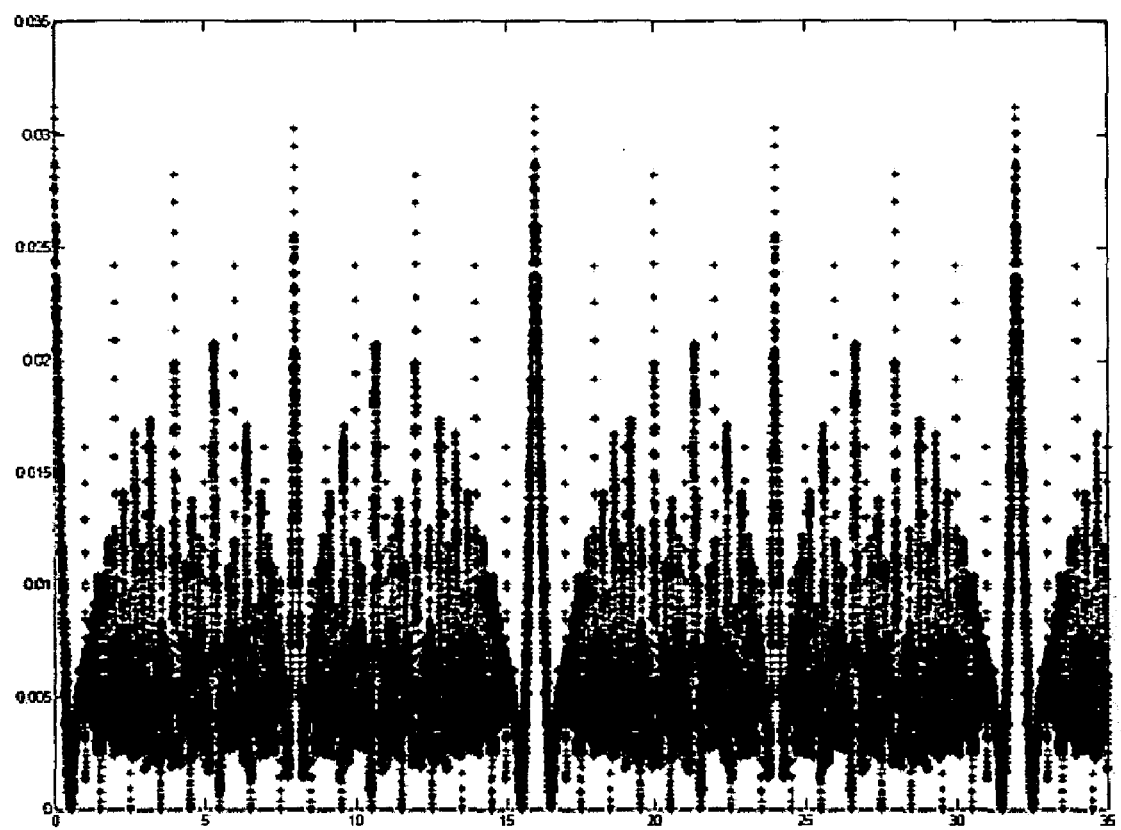
FIG. 12 is the p/2 dependence of the variance of the amplitude of DFT of a chirp at q=32.
Figure 13:
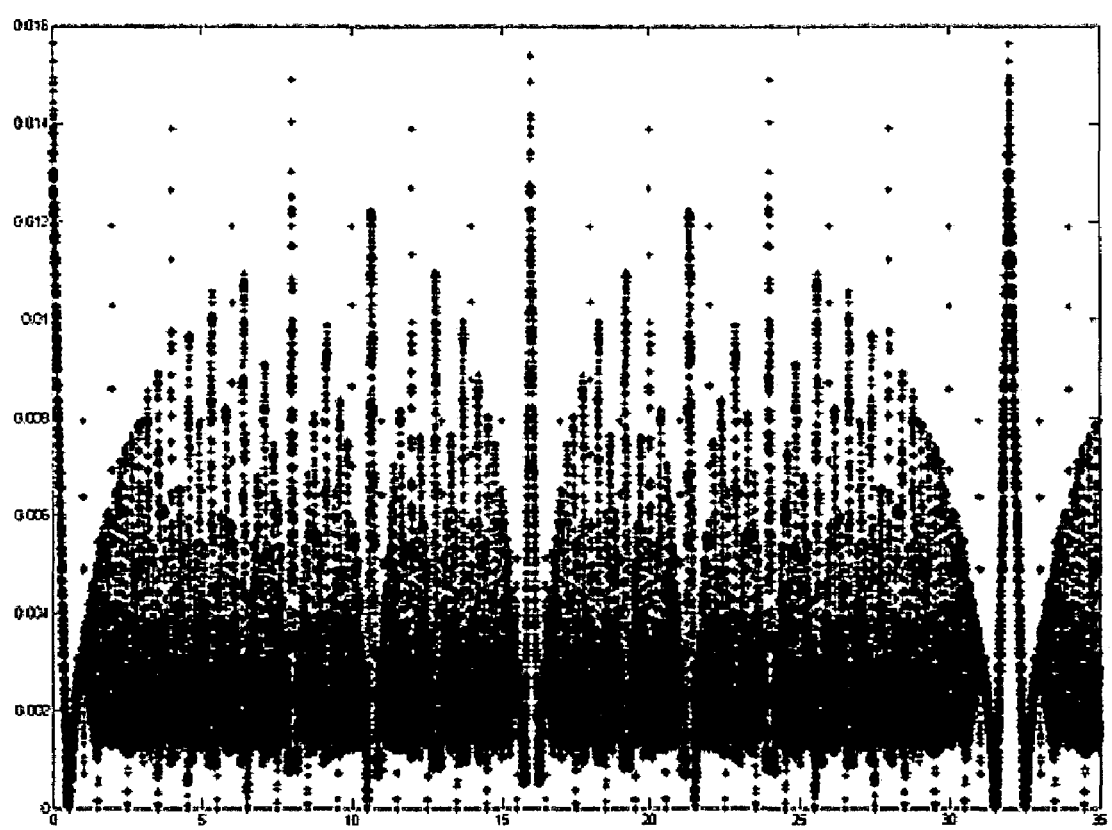
FIG. 13 is the p/2 dependence of the variance of the amplitude of DFT of a chirp at q=64.

Principal shifters can be generated numerically, for a given multi-tone transformation. FIG. 3 shows an example of f(r) of a principal shifter for 128-IDFT computed by minimizing PAPR functional in Eq. (3). FIG. 4 shows the values of f(r) for this principal shifter. However, this method is not perfect, as it is hard to numerically attain the absolute minimum of 1 in Eq. (3). Therefore, it is desirable to develop an analytical method of generating sequences that would satisfy the constant envelope property.

Flat Spectrum Chirps

Below it will be proven that for q-DFT, a class of sequences satisfying the constant envelope property is given by the formula:

$$\vec{z}(r) = \{\exp(\pm j\pi r^2 p/q)\} \quad (6)$$

In Eq. (6) r varies between 0 and q−1; and p and q are mutually prime and have different parities. Eq. (6) describes linear chirps that are well known in digital communications. However, only chirps with p and q specified above would satisfy the constant envelope property for q-DFT. To show this let us consider the following sum:

$$S(p, q) = \sum_{r=0}^{q-1} \exp(-j\pi r^2 p/q) \quad (7)$$

This is termed the Gauss sum and is considered in the number theory (Katz, 1987). The Gauss sum happens to be the sum of components of the principal shifter in Eq. (6). First, it will be proven that the absolute value of a Gauss sum, for p and q specified, is independent of p. Some known properties of Gauss sums will be used. The first property is its multiplicaticity:

$$(q',q'')=1 \Rightarrow S(p,q'q'')=S(pq',q'')S(pq''q') \quad (8)$$

i.e. at mutually prime q' and q" the sum on the l.h.s. of Eq. (8) can be presented as a product of two other sums. Apply the property (8) to the Gauss sum as follows:

$$S(1, pq)=S(p,q)S(q,p) \quad (9)$$

It did not seem to simplify the problem; however, there is another property of Gauss sums called the Schaar's identity, and it holds for mutually prime p and q of opposite parity. This identity can be presented as follows:

$$S^*(p,q)=\exp(j\pi/4)\sqrt{q/p}\,S(q,p) \quad (10)$$

where '*' denotes a complex conjugate. Combining Eqs. (9) and (10) yields:

$$\exp(j\pi/4)\sqrt{q/p}\,S(1, pq)=|S(p,q)|^2 \quad (11)$$

The sum on the l.h.s. of Eq. (11) can be evaluated by using again the Schaar's identity:

$$S(1, pq)=\exp(-j\pi/4)\sqrt{pq}\,S^*(pq,1)=\exp(-j\pi/4)\sqrt{pq} \quad (12)$$

Introducing Eq. (12) into Eq. (11) yields:

$$|S(p,q)|^2=q \quad (13)$$

This is what had to be proven.

It turns out that the condition of p and q being mutually prime integers of opposite parity yields the required constant envelope property for the DFT of the principal shifter in Eq. (6). To prove it, first notice that for p and q of opposite parity, shifting r in this Gauss sum does not change it:

$$\sum_{r=0}^{q-1} \exp(-j\pi r^2 p/q) = \sum_{r=0}^{q-1} \exp(-j\pi (r+m)^2 p/q) \quad (14)$$

The property (14) can be easily proven by induction. Now, Eq. (14) is equivalent to the following equation:

$$\sum_{r=0}^{q-1} \exp(-2j\pi nr/q - j\pi r^2 p/q) = S(p, q)\exp(j\pi m^2 p/q), \quad (15)$$

$$mp = n(\bmod q)$$

Eq. (15) establishes a relation between the DFT of a chirp with parameters p and q specified above and the Gauss sum in Eq. (7). Since p and q are mutually prime, it is always possible, for a given n, to find m such that remainders of dividing mp and n by q are equal. Moreover, for a given n, such m is uniquely found. Therefore, the DFT of such a chirp has a constant envelope equal to the absolute value of the corresponding Gauss sum:

$$\left|\sum_{r=0}^{q-1} \exp(-2j\pi nr/q - j\pi r^2 p/q)\right| = |S(p, q)| = \sqrt{q} \quad (16)$$

A chirp whose constant envelope property pertains to the DFT, is termed the flat spectrum chirp (FSC). While the proof was presented for FSC with the minus sign in Eq. (6), since absolute values of a complex number and its conjugate are equal, the constant envelope property holds for FSC with the plus sign in Eq. (6) as well. Also, as the IDFT matrix is, up to a constant multiplier 1/q, a conjugate to the DFT matrix, the constant envelope property for FSC in Eq. (6) pertains to IDFT as well.

Figure 14:
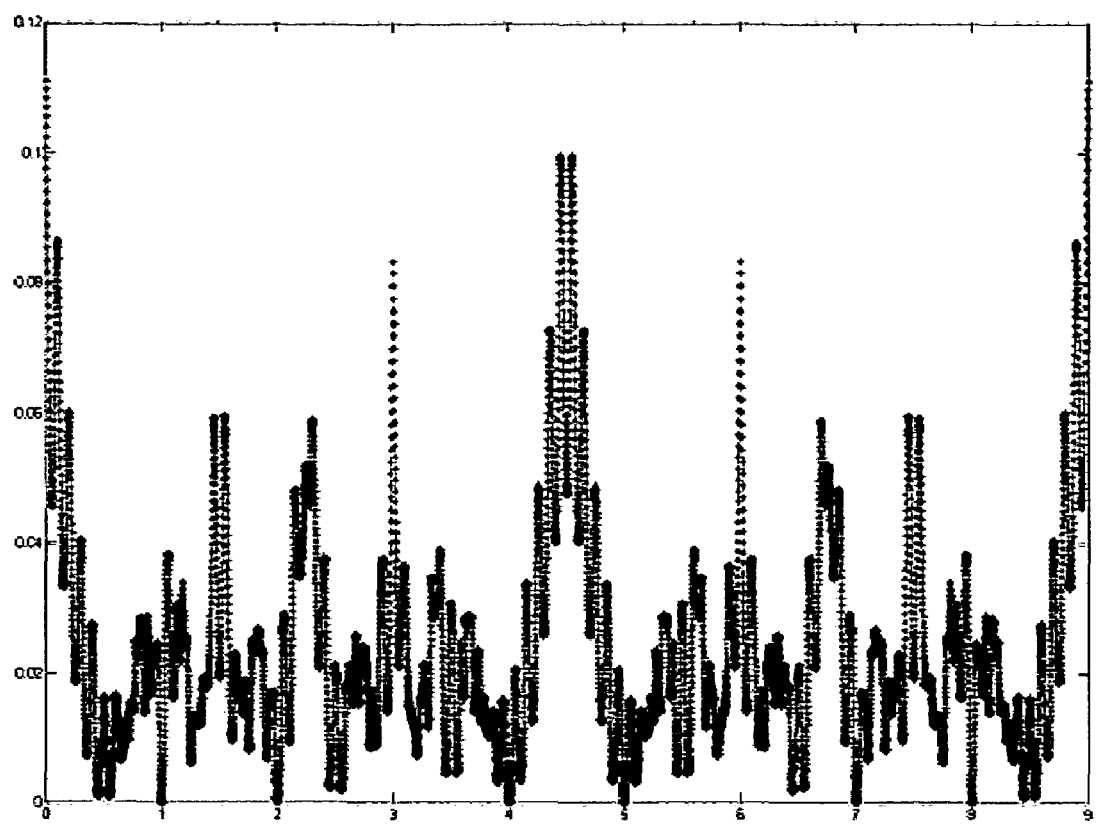
FIG. 14 is the p/2 dependence of the variance of the amplitude of DFT of a chirp at q=9.
Figure 15:
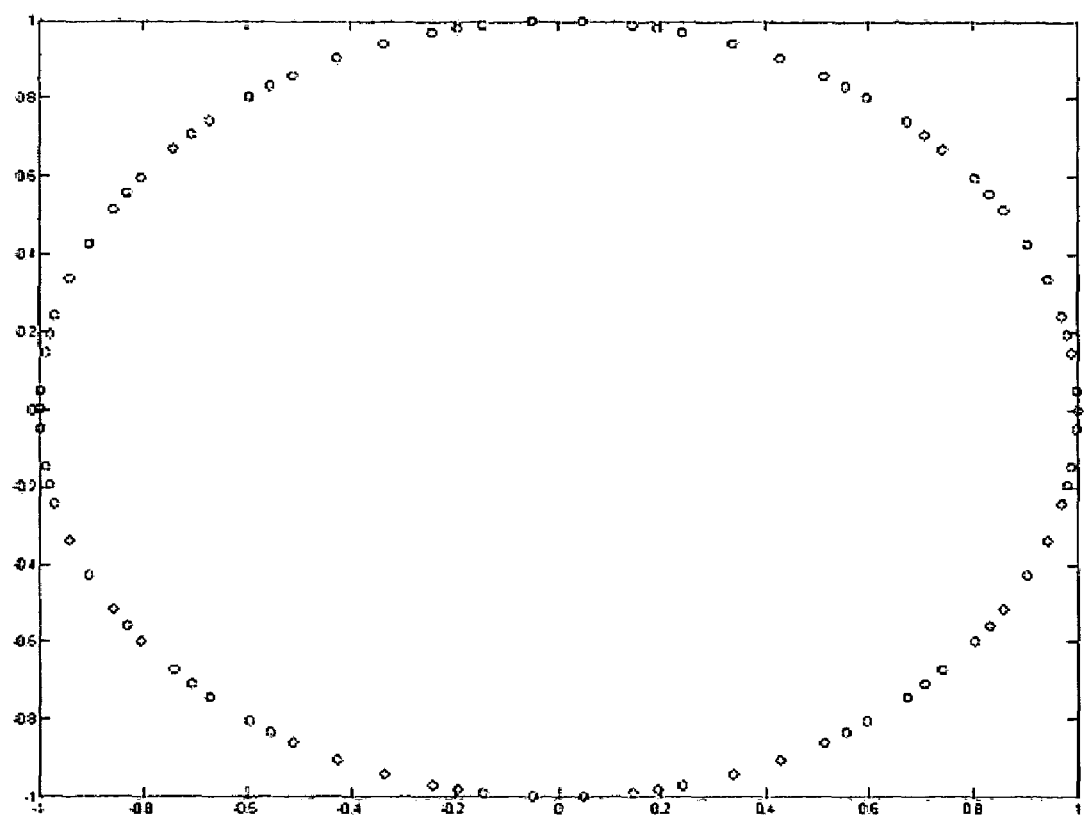
FIG. 15 shows a distribution of components of FSC on the complex plane at q=64.
Figure 16:
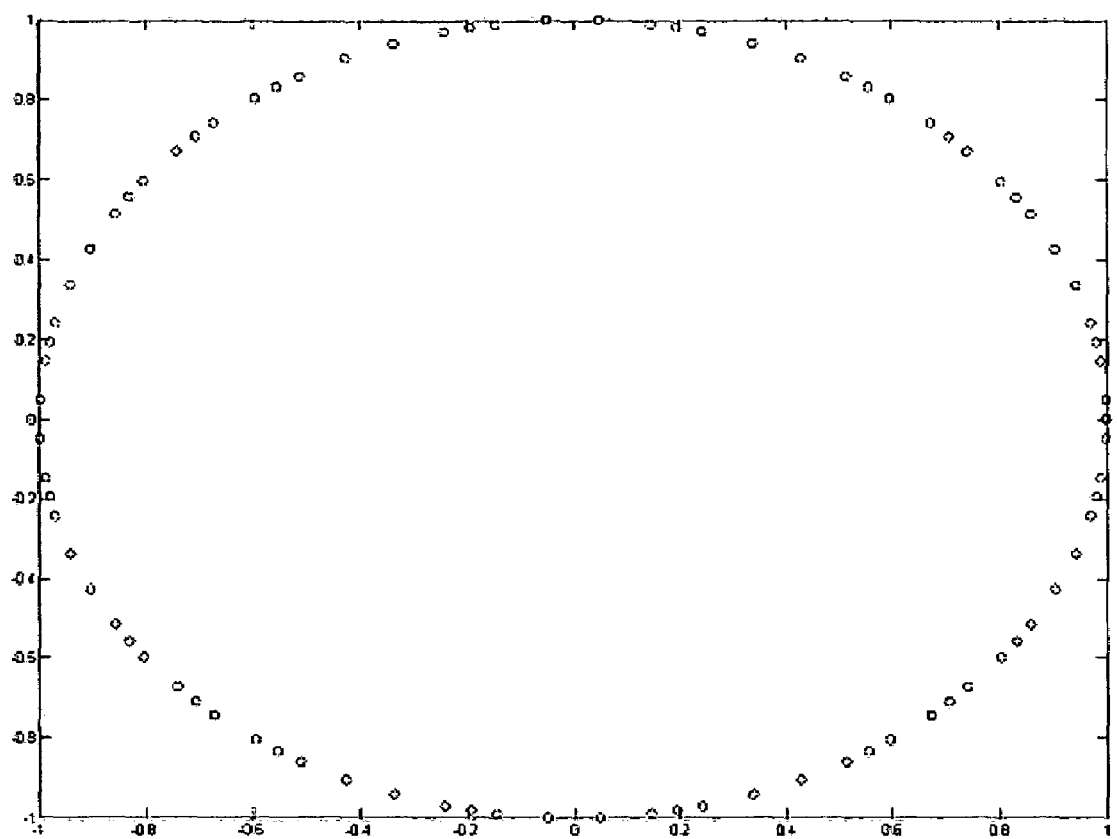
FIG. 16 shows a distribution of components of DFT of FSC on the complex plane at q=64.
Figure 17:
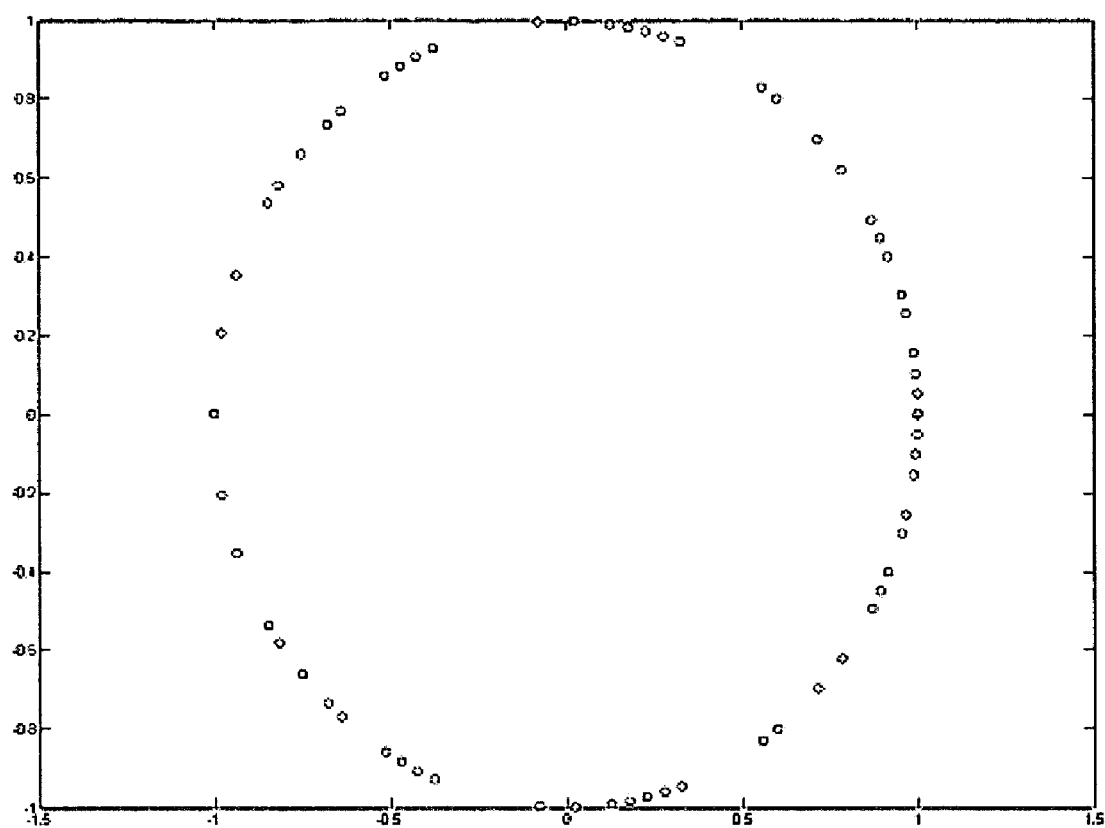
FIG. 17 shows a distribution of components of DFT of FSC on the complex plane at q=61 and at p=2m, m=1, ..., 60.
Figure 18:
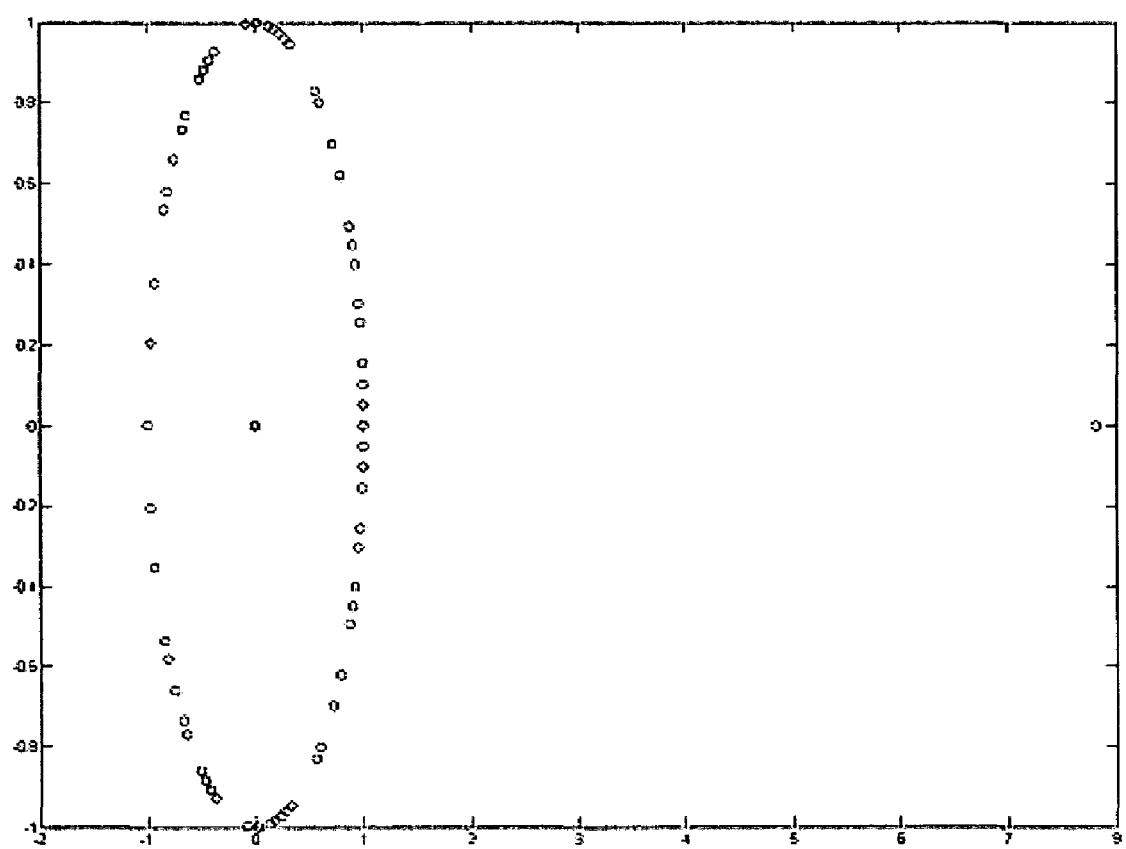
FIG. 18 shows a distribution of components of DFT of a chirp on the complex plane at q=61 and at p=2m, m=1, ..., 61.
Figure 19:
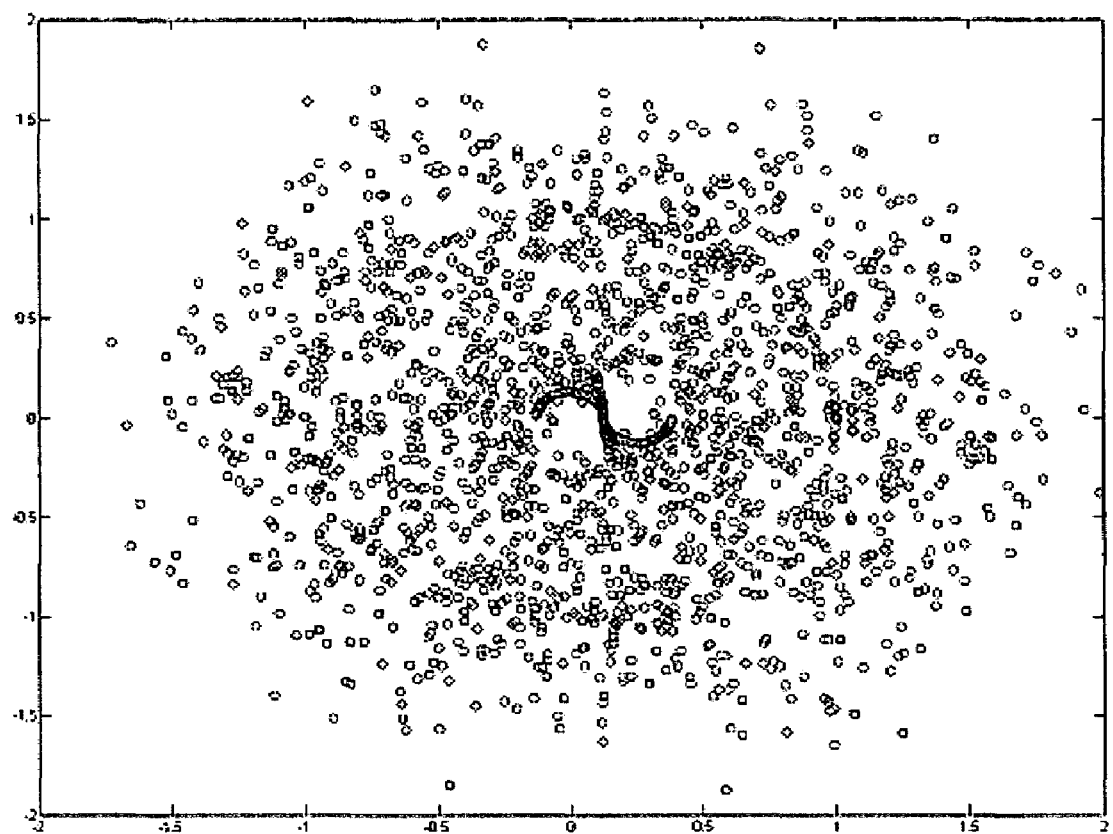
FIG. 19 shows a distribution of components of DFT of a chirp on the complex plane at q=61 and at p=m, m=1, ..., 60.
Figure 20:
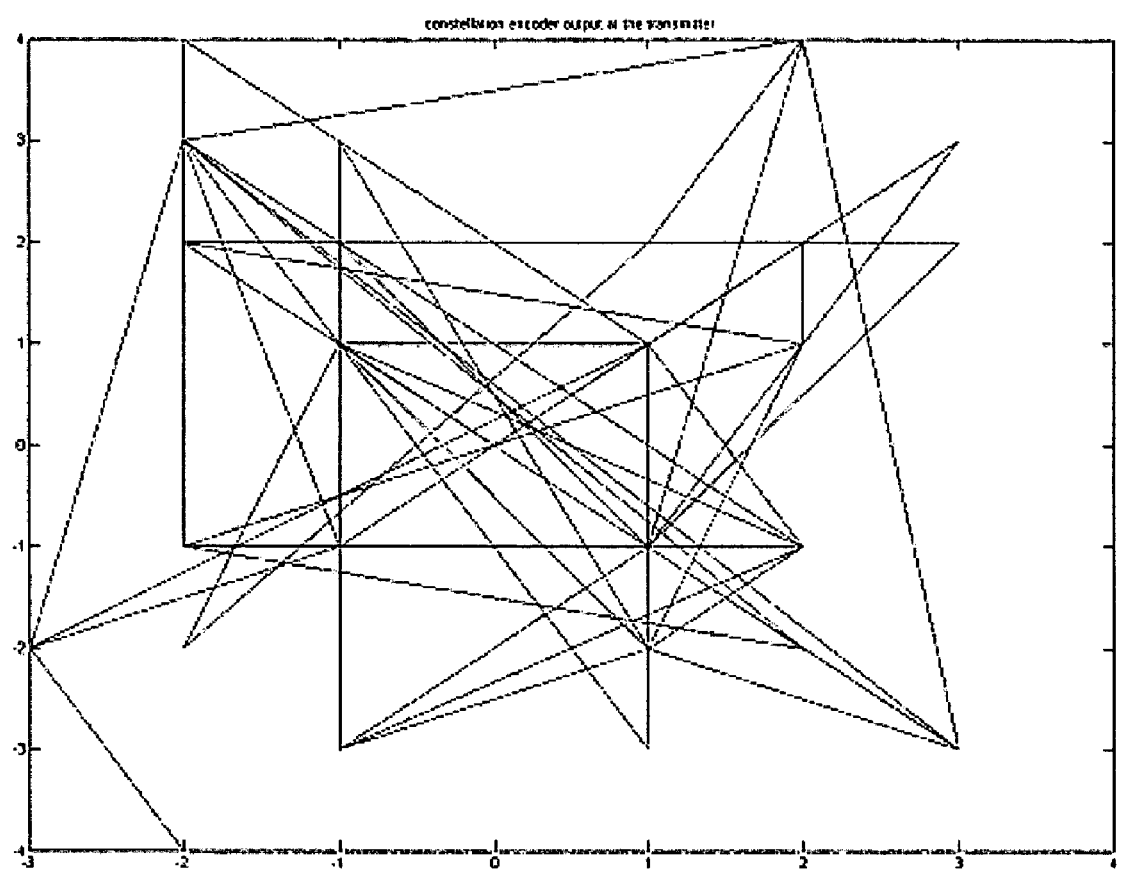
FIG. 20 shows an example of the constellation encoder module output at the transmitter of a 64-carrier system simulated.
Figure 21:
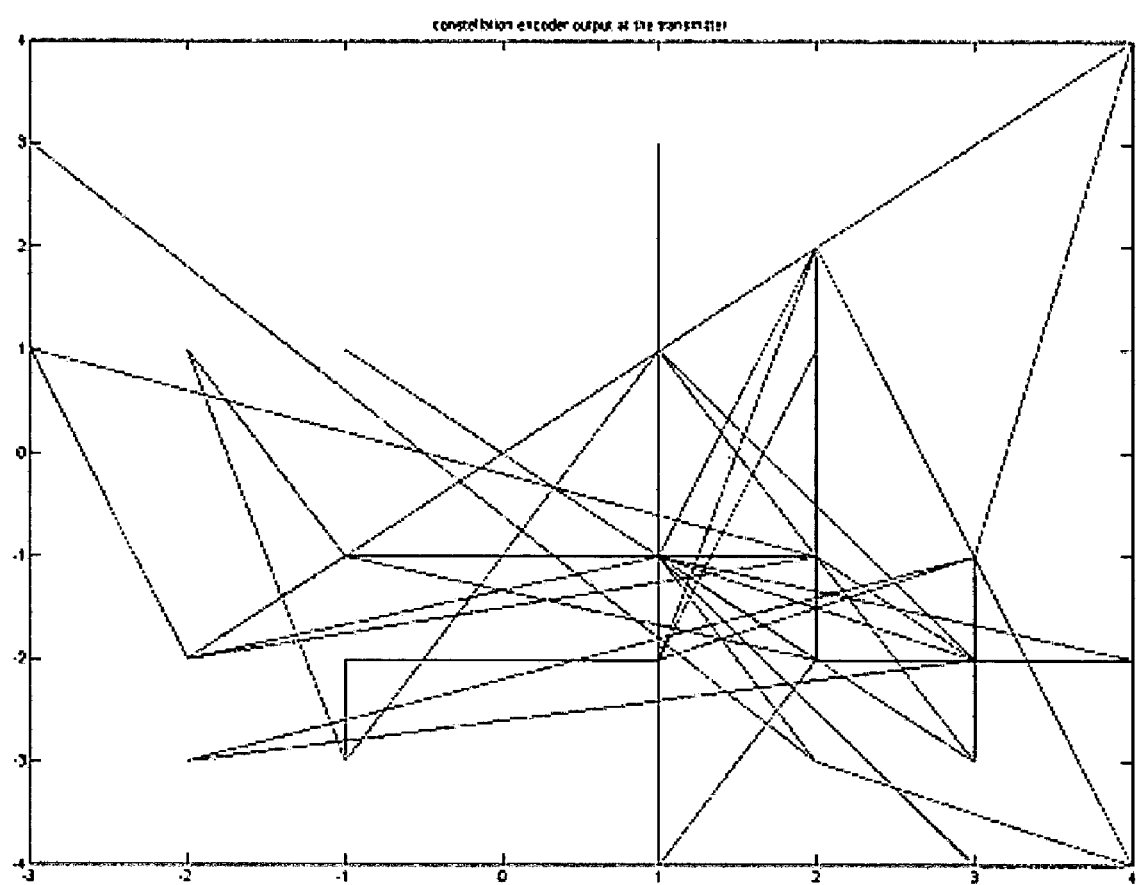
FIG. 21 shows an example of the constellation encoder module output at the transmitter of a 64-carrier system simulated, for the most homogeneous data set.
Figure 22:
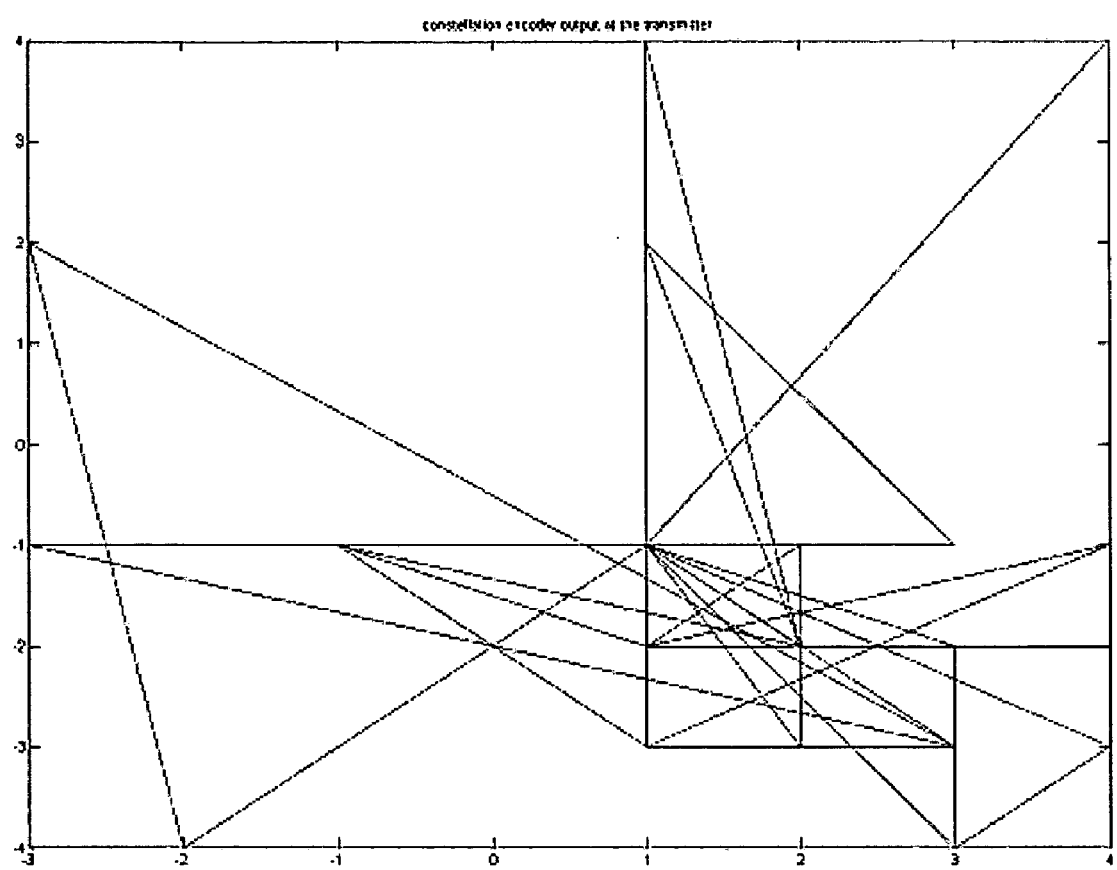
FIG. 22 shows an example of the constellation encoder module output at the transmitter of a 64-carrier system simulated, for the second most homogeneous data set.
Figure 23:
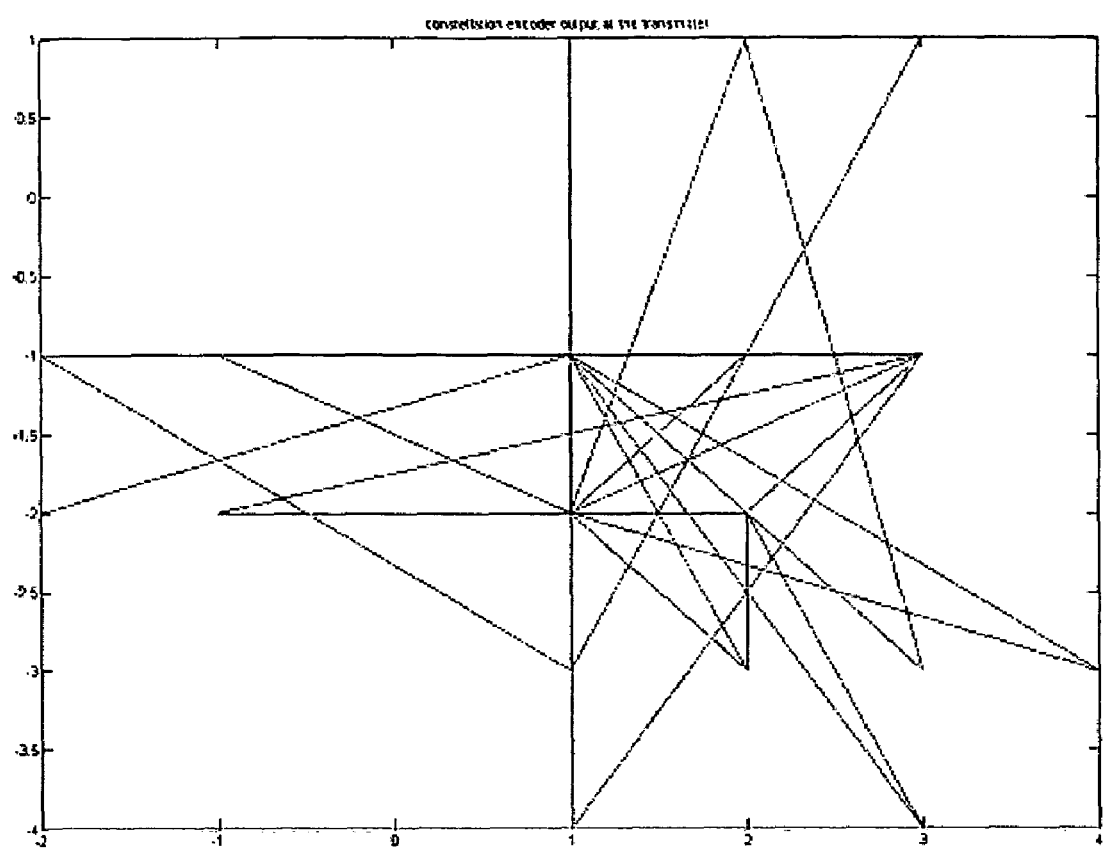
FIG. 23 shows an example of the constellation encoder module output at the transmitter of a 64-carrier system simulated, for the third most homogeneous data set.
Figure 24:
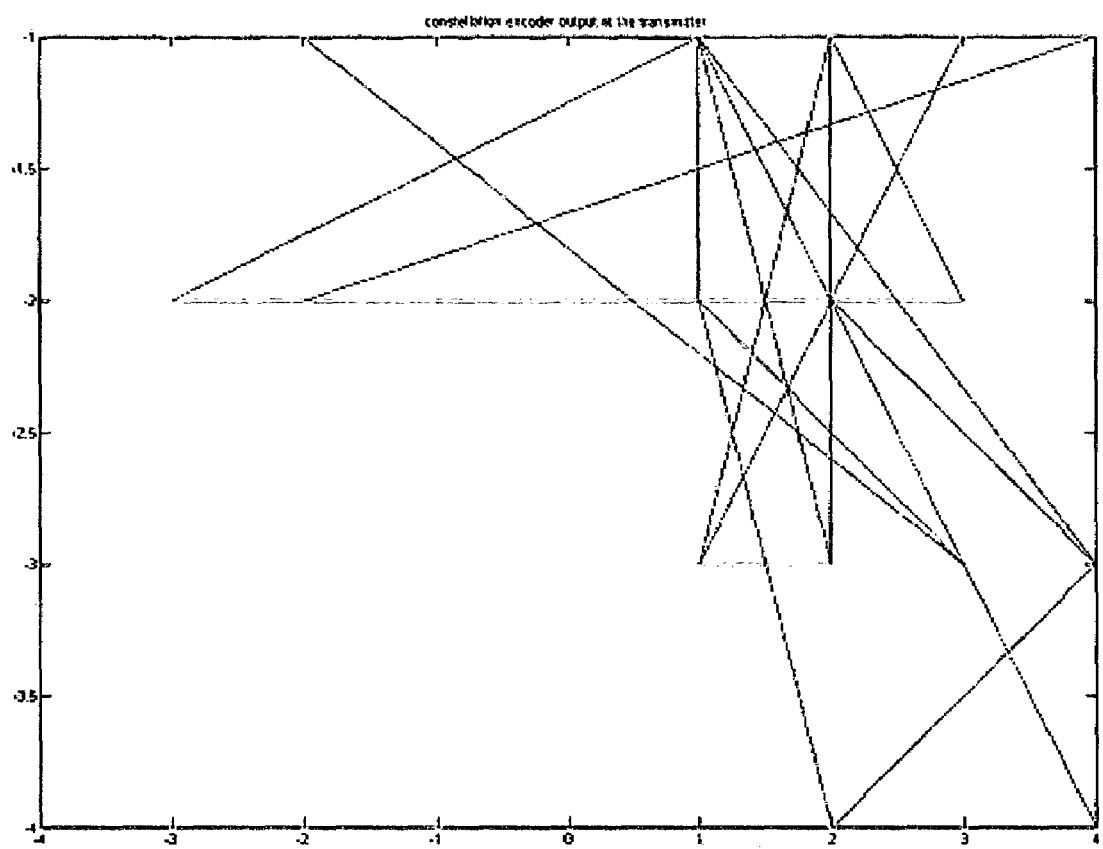
FIG. 24 shows an example of the constellation encoder module output at the transmitter of a 64-carrier system simulated, for the fourth most homogeneous data set.
Figure 25:
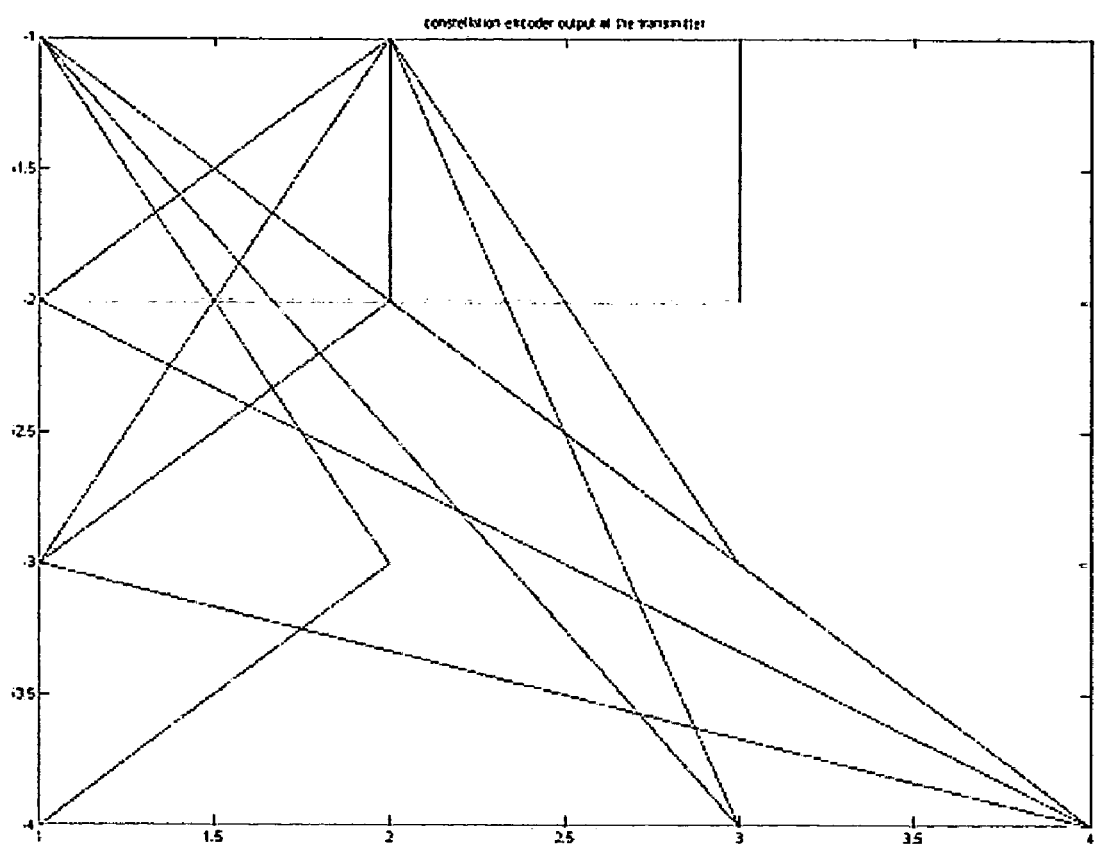
FIG. 25 shows an example of the constellation encoder module output at the transmitter of a 64-carrier system simulated, for the fifth most homogeneous data set.
Figure 26:
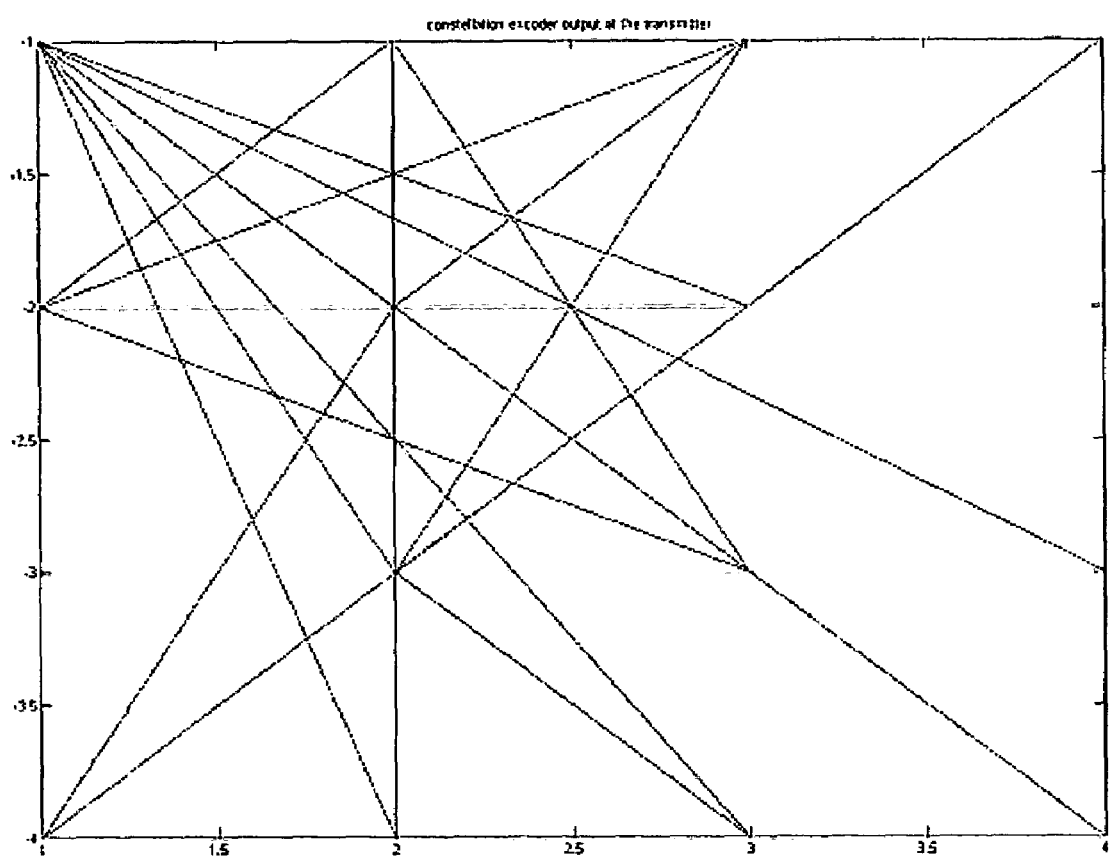
FIG. 26 shows an example of the constellation encoder module output at the transmitter of a 64-carrier system simulated, for the sixth most homogeneous data set.
Figure 27:
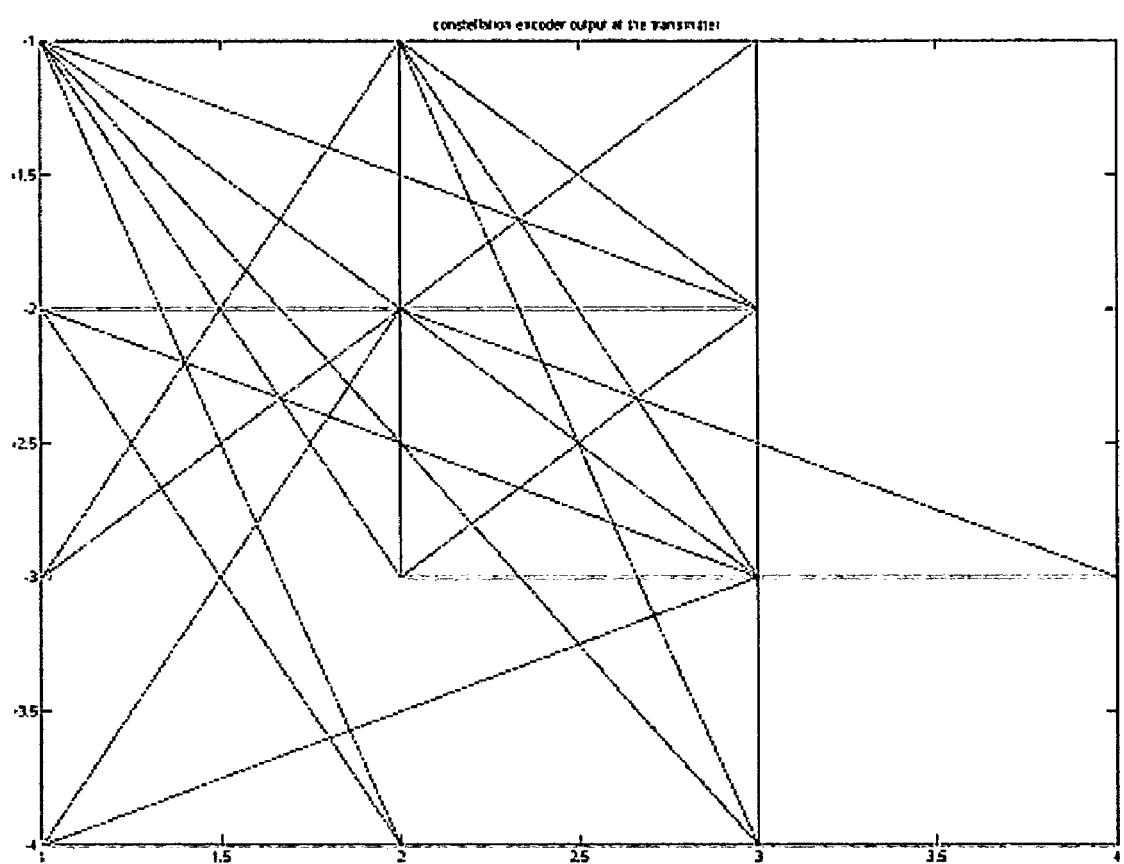
FIG. 27 shows an example of the constellation encoder module output at the transmitter of a 64-carrier system simulated, for the most inhomogeneous data set.

FIGS. 5 to 8 show f(r) of FSC at q=64 and p=27, 5, 61, and 1, respectively. These functions are symmetrical with respect to the middle of the interval (0, q). FIGS. 9 to 13 show the dependence of the envelope variance of the DFT of chirps on p/2 at q=4, 8, 16, 32, and 64, respectively. These figures present a numerical corroboration of the constant envelope property of FSC. They show that the variance vanishes at p/2=0.5+s where s is an integer. For practical applications, the case of q being a power of 2 is the most important one, as then the FFT can be used for the DFT. In this case FSC correspond to p being an odd integer. FIG. 14 shows the dependence of the envelope variance of the DFT of chirps on p/2 at q=9. As follows from the theory presented above, the variance should vanish at p=2, 4, and 8; FIG. 14 shows that it does. FIGS. 15 and 16 show a distribution of values of components of FSC and of the DFT of FSC, respectively, at q=64: the constant envelope property holds. If q is an odd prime number an appropriate set of FSC corresponds to p=2s, s=1, . . . , q–1. At q=61 a distribution of values of components of DFT of FSC is shown in FIG. 17: the constant envelope property holds. FIGS. 18 and 19 show these distributions in cases when some of the conditions used in deriving the constant envelope property of FSC are violated. FIG. 18 corresponds to the set of FSC shown in FIG. 17 appended by one more chirp with p=q. The distribution now contains two additional points that do not lie on the circle. FIG. 19 corresponds to q=61 and positive p smaller than q. The values of components of the DFT of these chirps are spread all over the complex plane. While in this set, p are mutually prime to q, the second condition that should be imposed on p is violated because some p are of the same parity as q.

If FSC are used as phase shifters, the worst case sequence consisting of identical components becomes an optimal input sequence to the phase shifter module, corresponding to the PAPR of unity regardless of a specific FSC. Moreover, in cases of q being a prime number or a power of 2 one can construct a plurality of such optimal input sequences. Specifically, choosing an arbitrary pair of FSC, components of an optimal input sequence are ratios of corresponding components of the first to the second FSC. These optimal input sequences can be employed as signaling patterns in a communication protocol used in the multi-carrier system.

Simulations of Multi-carrier Transmission

A Matlab simulator was developed to verify the effectiveness of the phase shifters introduced above. FIGS. 20 to 38 present the results of simulations. An OFDM (orthogonal frequency division multiplexing) transmission system was simulated. The total number of subcarriers was 64. For each subcarrier, a 64-QAM constellation encoder was used. A baseband AWGN channel with the SNR of 40 dB was considered. Eight sets of OFDM symbols were transmitted. Each set consisted of 100 OFDM symbols. Sets with larger order numbers had been formed out of more inhomogeneous data. FIGS. 20 to 27 are examples of IDFT input sequences corresponding to different sets. For larger set order numbers, components of input sequences are increasingly localized in the fourth quadrant of the complex plane.

Figure 28:
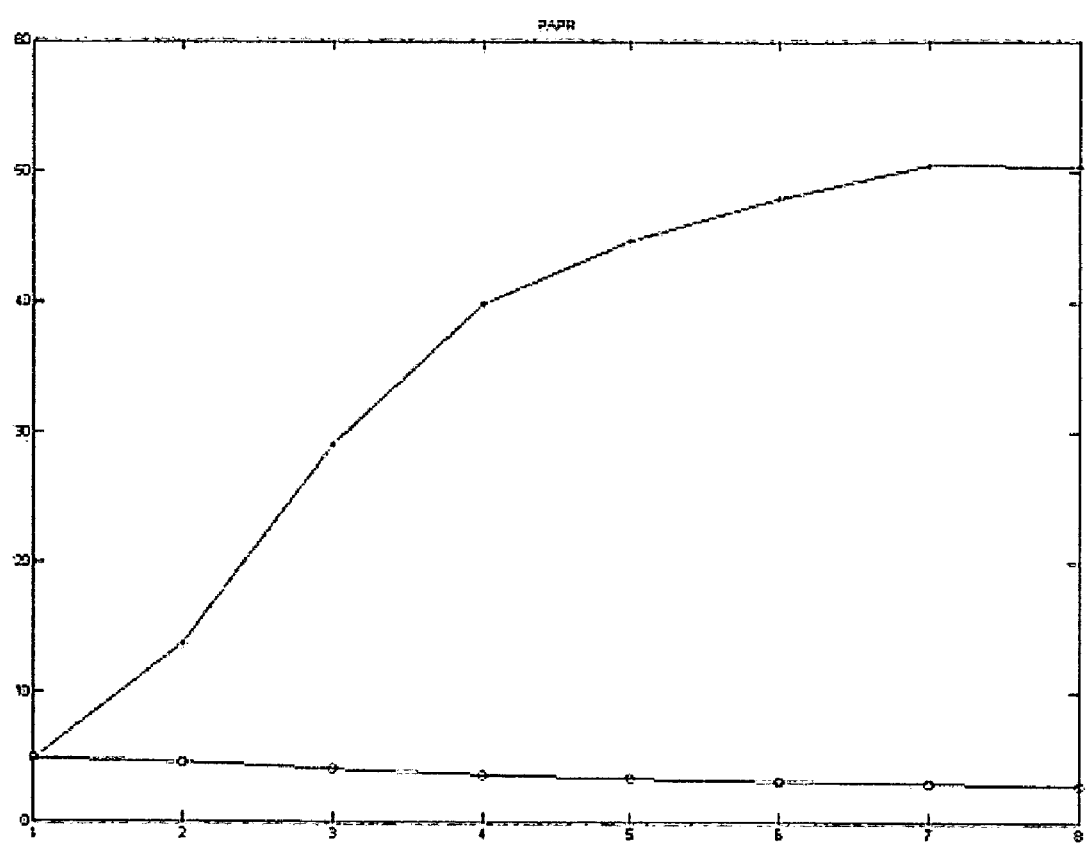
FIG. 28 shows a comparison between PAPR averaged over data sets of different homogeneity with phase shifters (circles) and without (diamonds).
Figure 29:
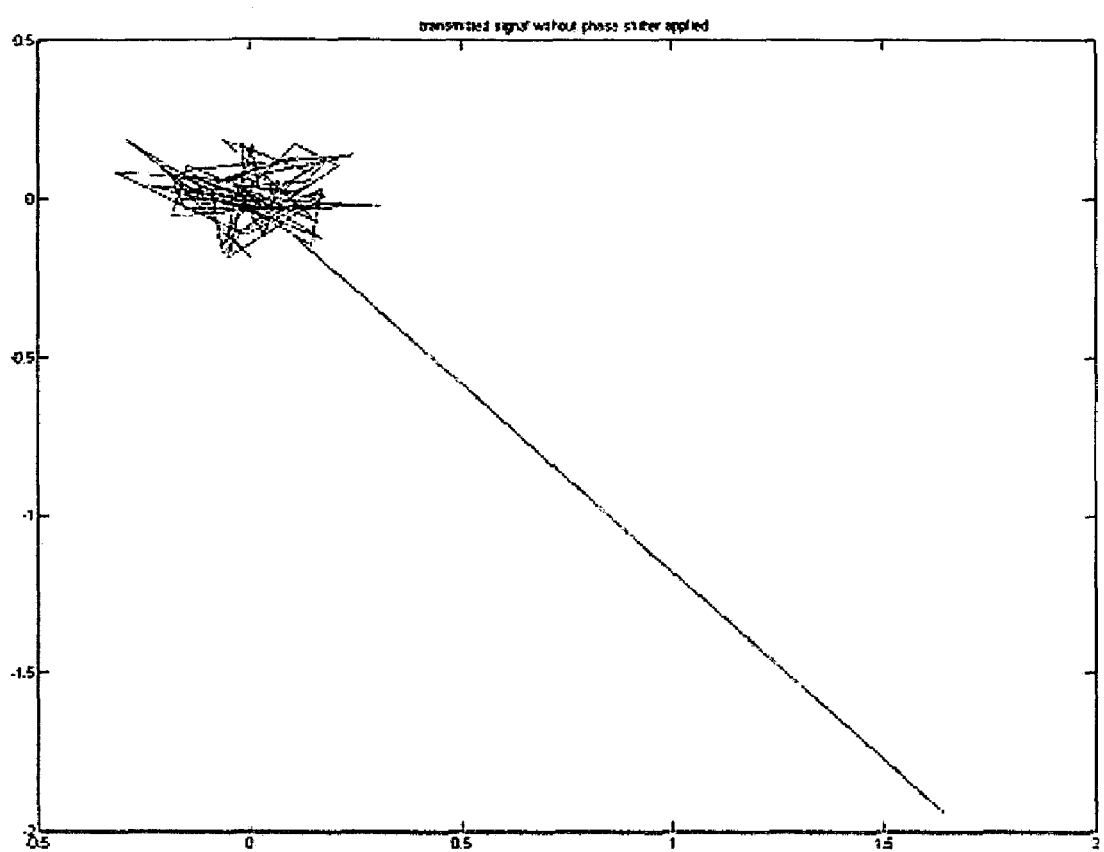
FIG. 29 shows distribution on the complex plane of components of an OFDM symbol transmitted, in the case of the most asymmetric (the last one) data set, without phase shifters applied.
Figure 30:
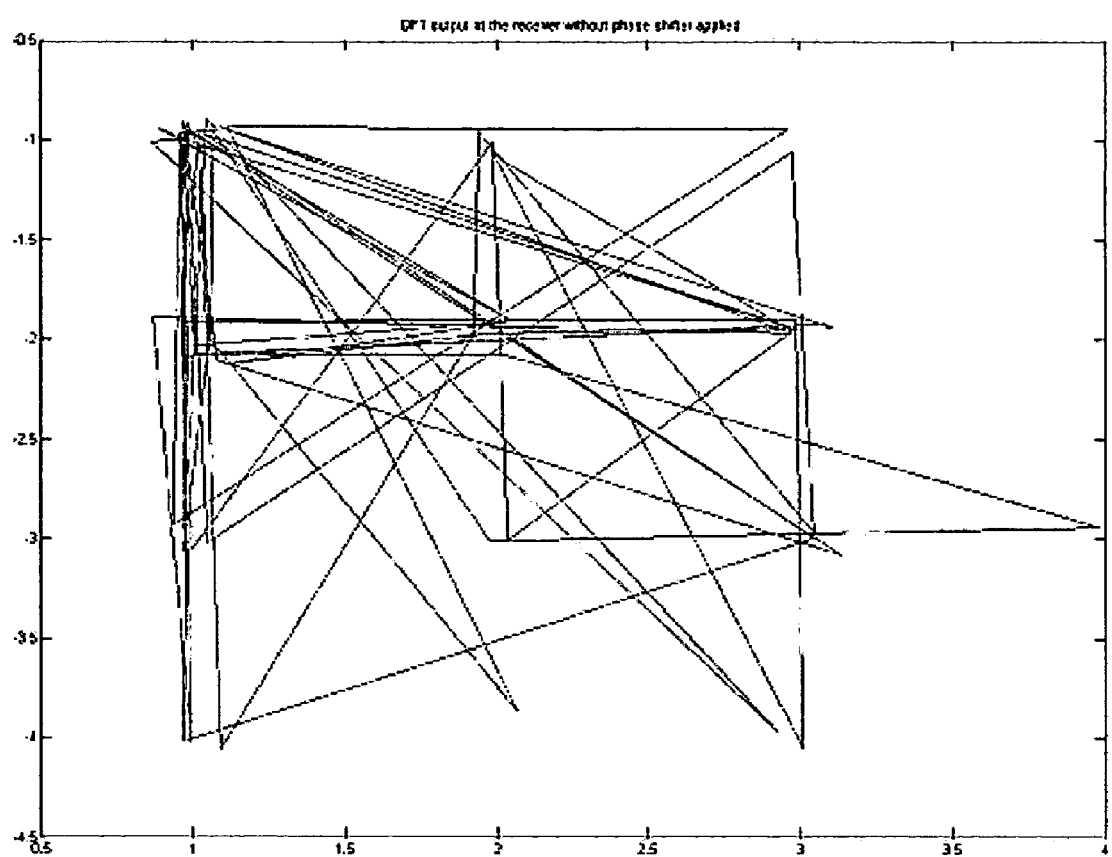
FIG. 30 shows distribution on the complex plane of components of a data sequence at the output of DFT module at the receiver, in the case of the most asymmetric (the last one) data set, without phase shifters applied.
Figure 31:
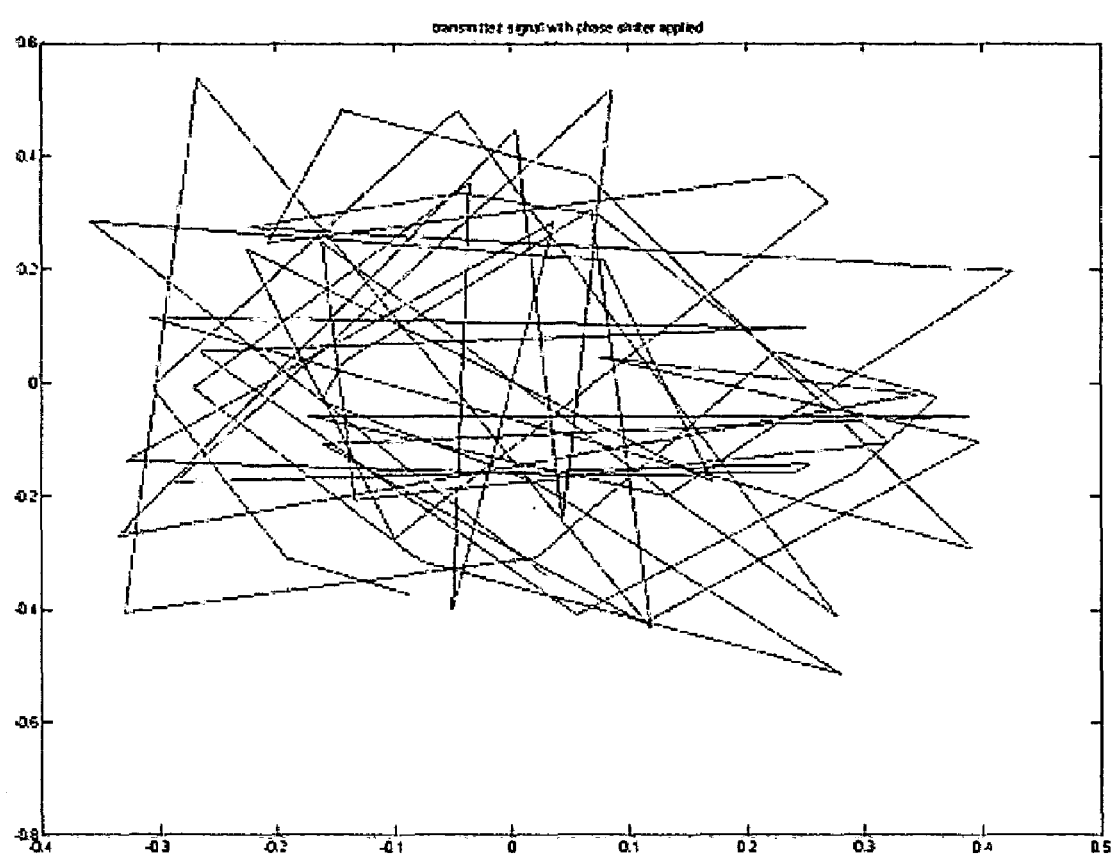
FIG. 31 shows distribution on the complex plane of components of an OFDM symbol transmitted, in the case of the most asymmetric (the last one) data set, with phase shifters applied.
Figure 32:
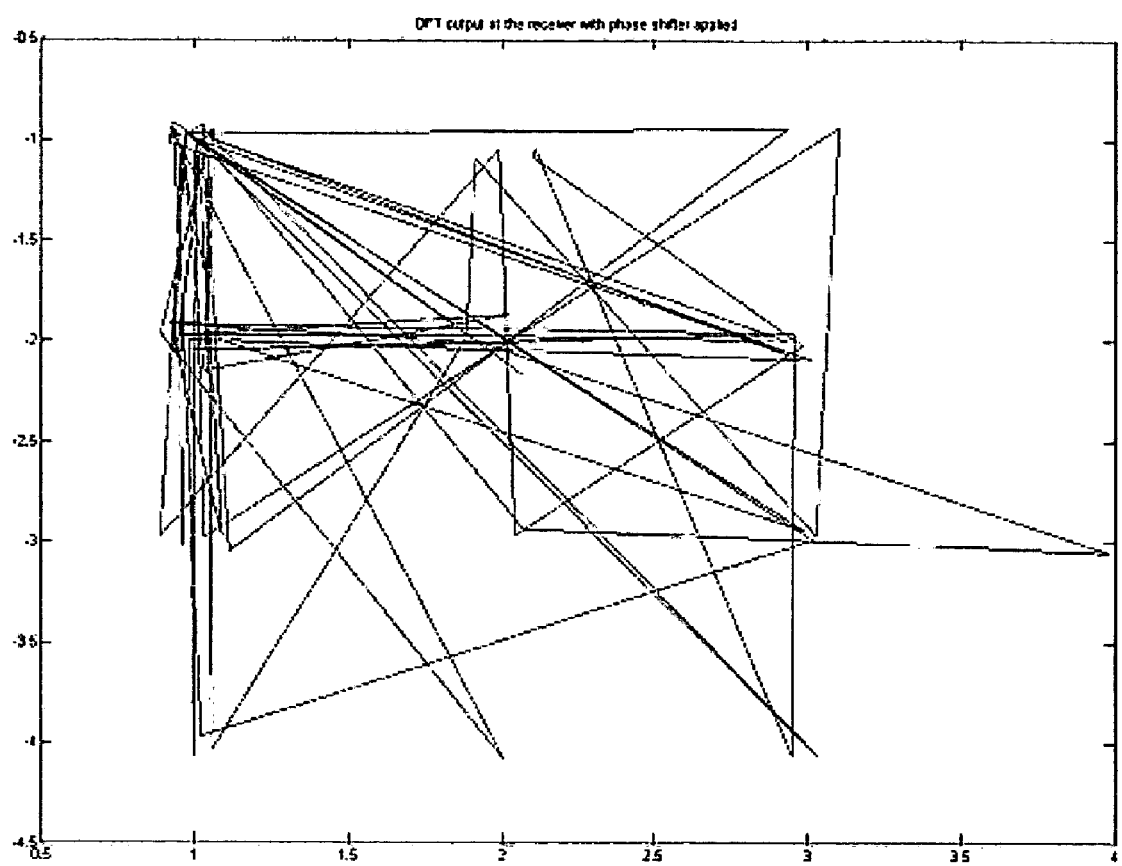
FIG. 32 shows distribution on the complex plane of components of a data sequence at the output of DFT module at the receiver, in the case of the most asymmetric (the last one) data set, with phase shifters applied.
Figure 33:
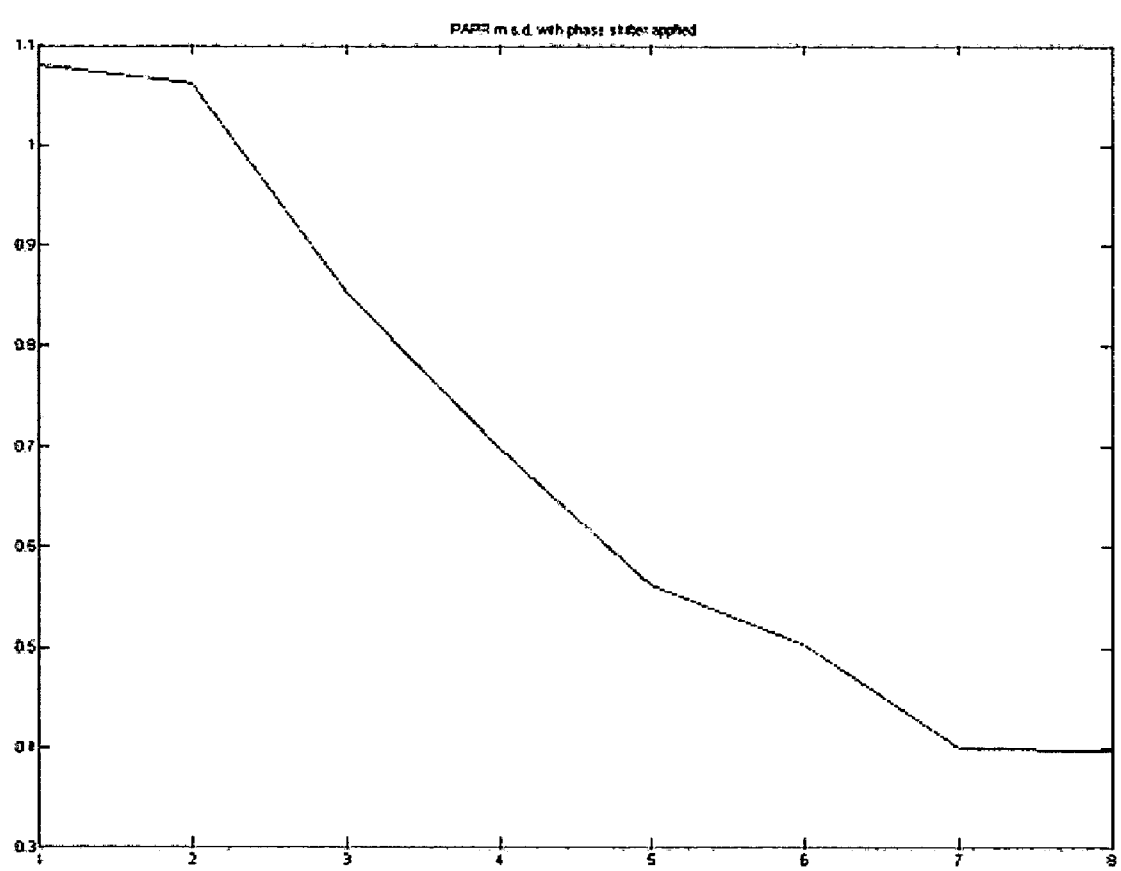
FIG. 33 shows the mean square deviation of PAPR over OFDM symbols from the same set, for different sets, in case of phase shifters applied.
Figure 34:
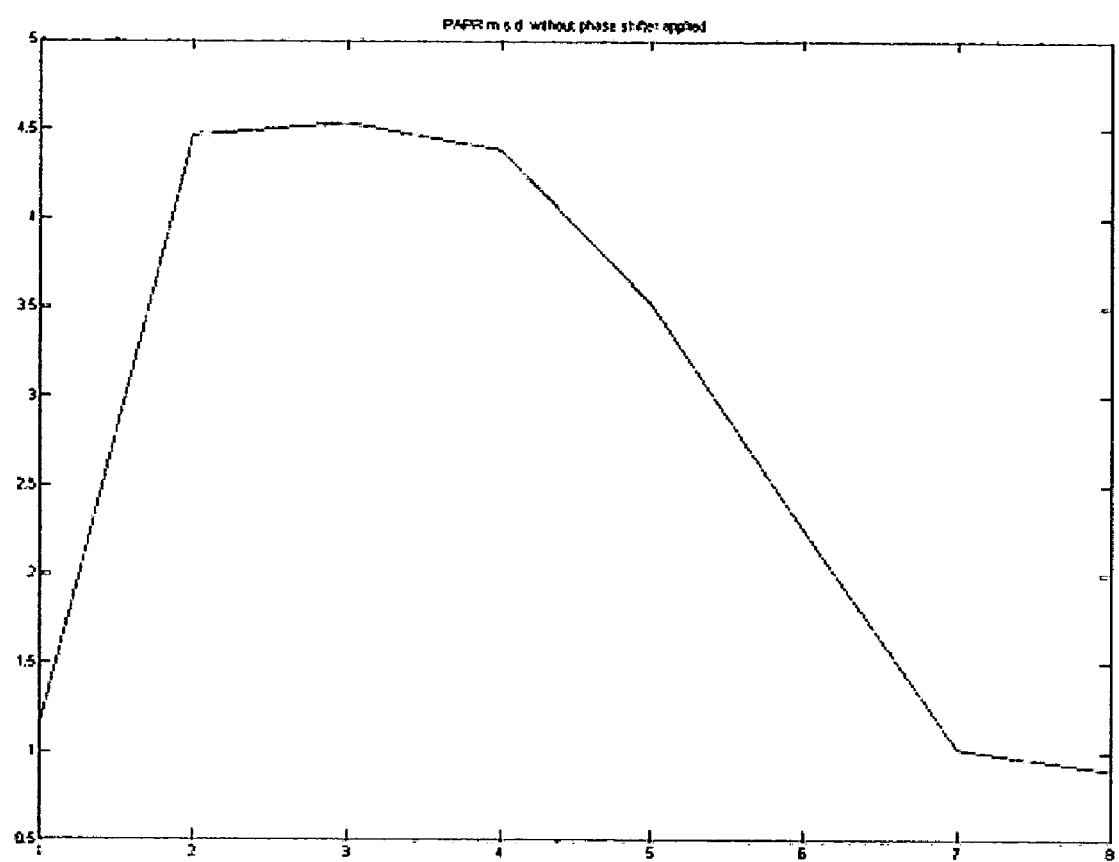
FIG. 34 shows the mean square deviation of PAPR over OFDM symbols from the same set, for different sets, in case of no phase shifters.

For phase shifters, (p, 64)-FSC were used. For a given IDFT input sequence, p was chosen as a successive element of a predefined, generally pseudorandom sequence of odd integers; this is illustrated in FIGS. 1 and 2. The worst case sequence was chosen with all components equal to unity. FIG. 28 shows a comparison between the PAPR averaged over each set of OFDM symbols, with phase shifters applied (circles) and without (diamonds), for different sets. The phase shifters proposed act more and more effectively as the inhomogeniety of the input data increases. For the most asymmetric data set (the last one), using phase shifters yields approximately a twenty-fold decrease in PAPR. FIG. 29 shows the distribution of components of a transmitted OFDM symbol on the complex plane, in the case of the most asymmetric data set, without phase shifters applied. One of the components is way off the area of the plane where the rest are localized which results in a high PAPR value. FIG. 30 shows the corresponding data at the output of DFT module at the receiver. FIG. 31 shows the distribution of components of the transmitted OFDM symbol on the complex plane for the same input data that were used in FIG. 29. This figure presents the results with phase shifters applied: unlike FIG. 29, this distribution of components is compact. FIG. 32 shows the corresponding data at the output of the DFT module at the receiver. FIGS. 30 and 32 look identical; this means that applying phase shifters greatly reduces PAPR without negatively affecting the system performance. The figure showing the output of the constellation decoder module is not presented, as it is identical to FIG. 27: in all simulations performed at the SNR of 40 dB, no transmission errors were observed. FIG. 33 shows the mean square deviation of PAPR over OFDM symbols from the same set, for different sets, in the case of phase shifters applied. The PAPR variation is largest in the case of the most homogeneous set and smallest in that of the most inhomogeneous set. FIG. 34 shows the mean square deviation of PAPR over OFDM symbols from the same set, for different sets, in the case of no phase shifters. As in FIG. 33, the PAPR variation is largest in the case of the most homogeneous set, and it is smallest for the most inhomogeneous set. However, comparing FIGS. 33 and 34 shows that while in the most homogeneous and inhomogeneous cases the m.s.d. without phase shifters is about the same as with phase shifters, for sets of intermediate homogeneity the m.s.d. without phase shifters is as much as six times higher than that with phase shifters. Therefore, applying the proposed phase shifters greatly reduces both instantaneous and average PAPR.

Figure 35:
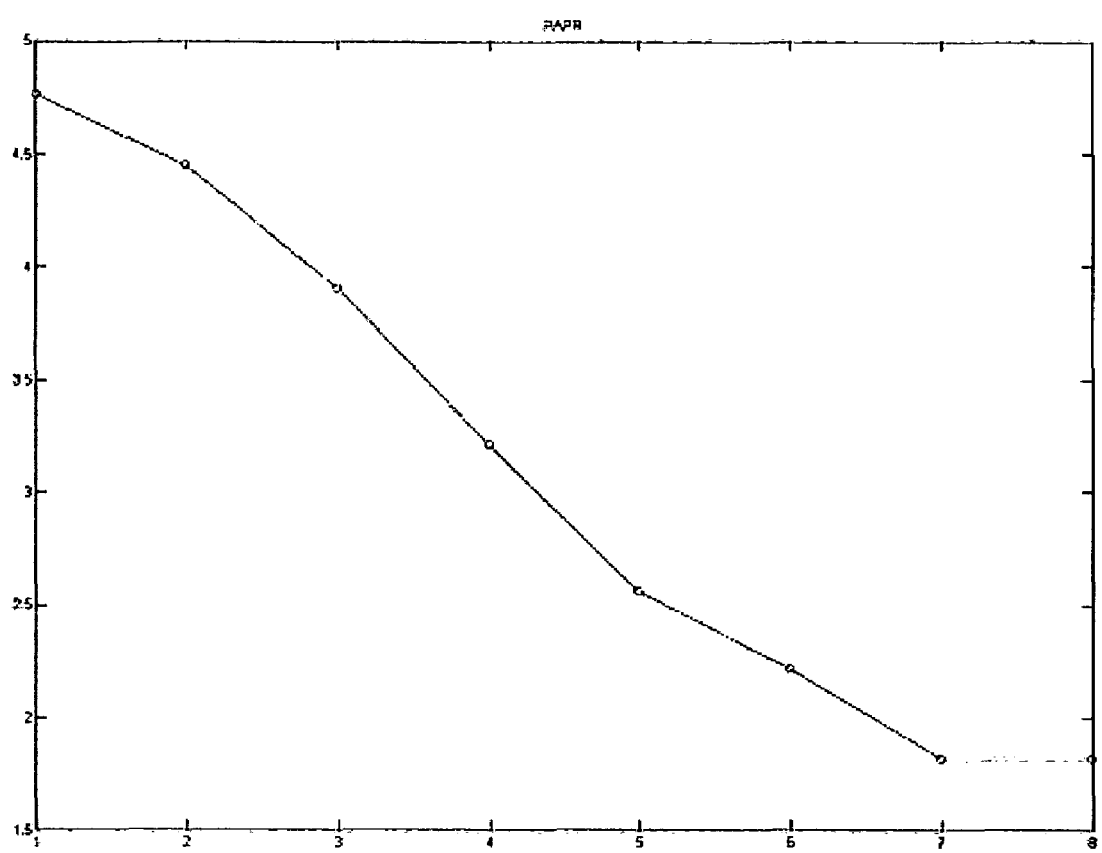
FIG. 35 shows PAPR averaged over data sets of different homogeneity, for a chirp with p=1 as a phase shifter, in a 61-carrier communication system.
Figure 36:
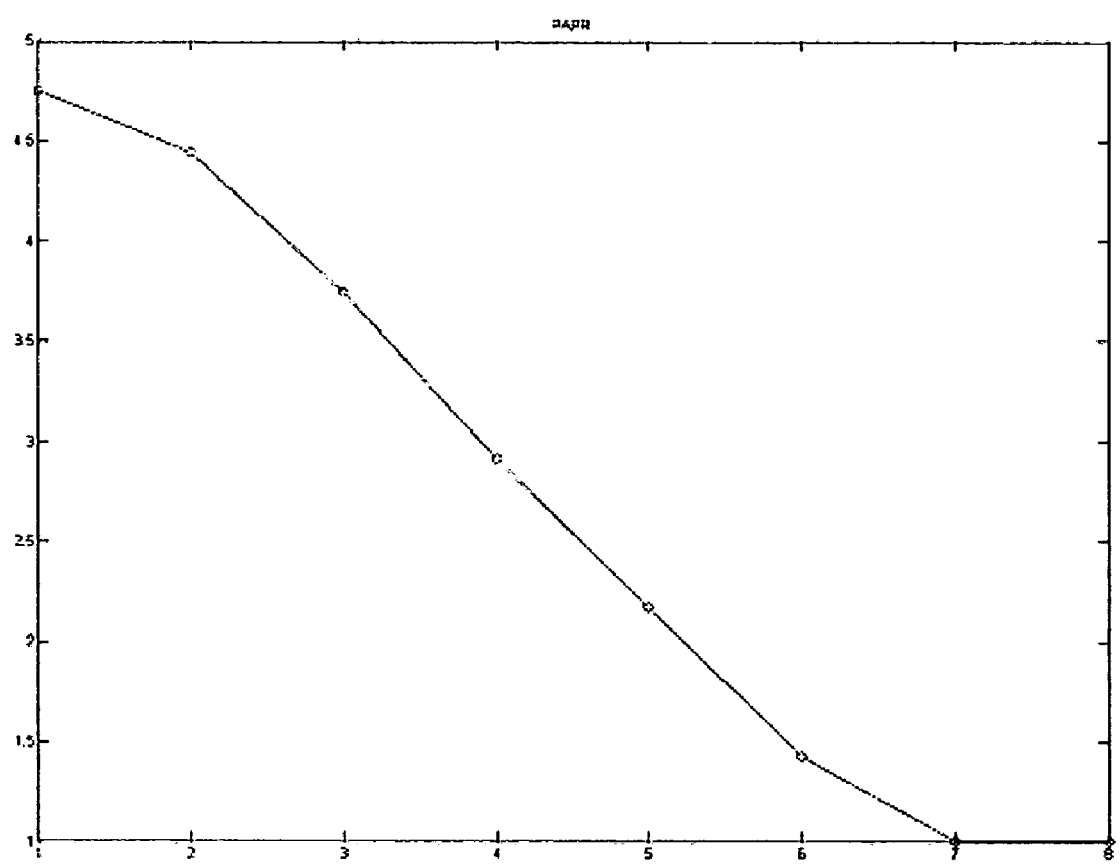
FIG. 36 shows PAPR averaged over data sets of different homogeneity, for an FSC with p=20 as a phase shifter, in a 61-carrier communication system.
Figure 37:
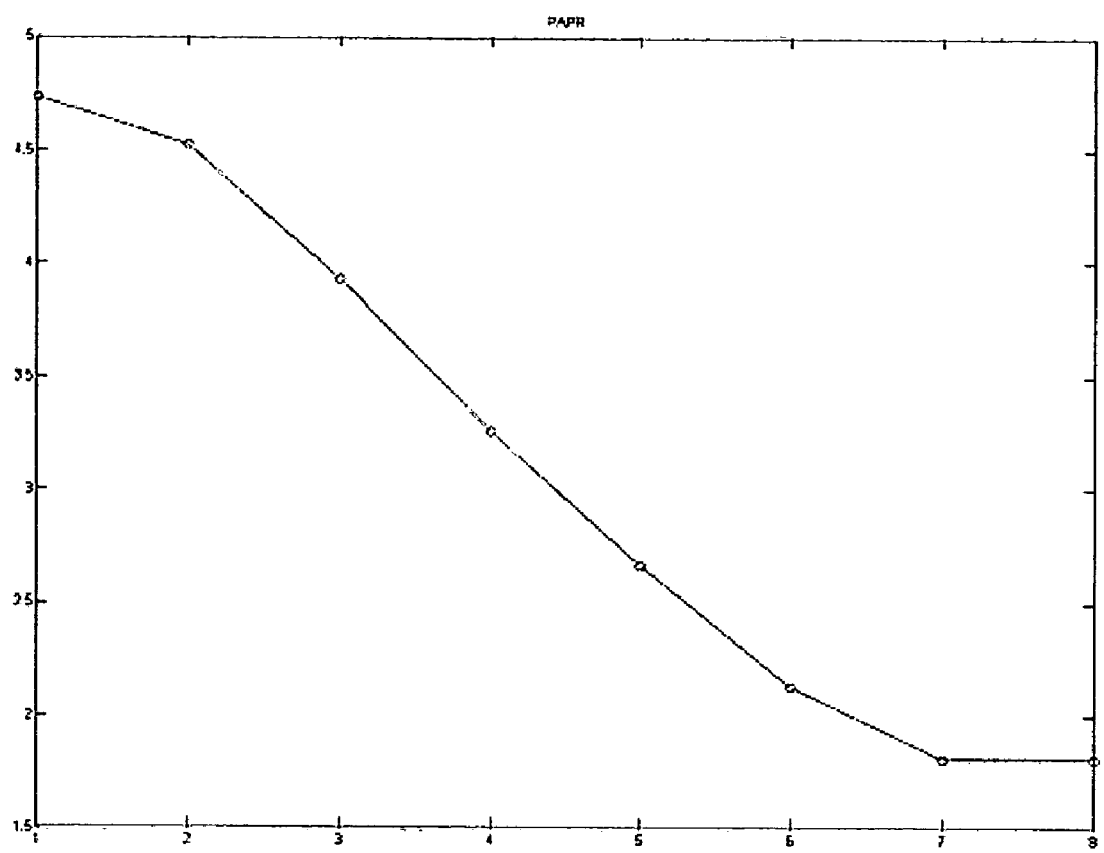
FIG. 37 shows PAPR averaged over data sets of different homogeneity, for a chirp with p=1 as a phase shifter, in a 63-carrier communication system.
Figure 38:
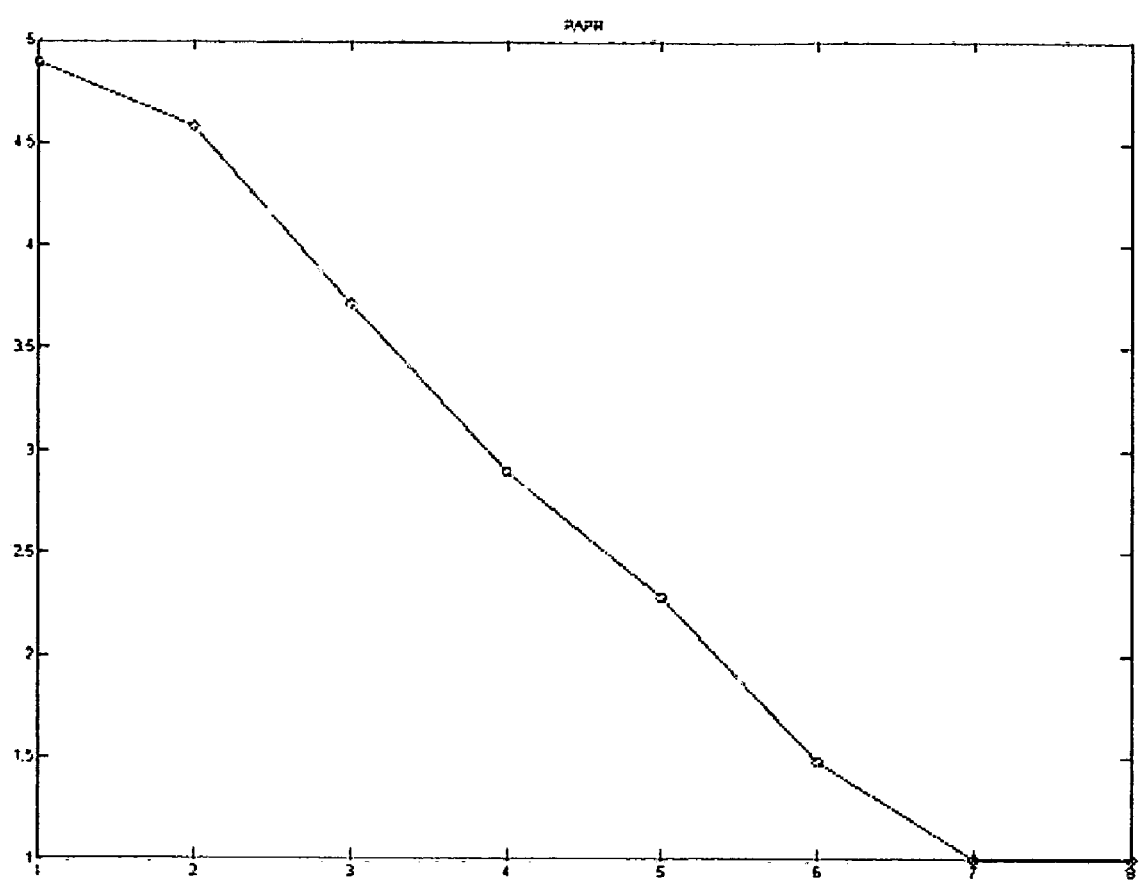
FIG. 38 shows PAPR averaged over data sets of different homogeneity, for an FSC with p=2 as a phase shifter, in a 63-carrier communication system.

FIGS. 35 to 38 present results of simulations of a system with the total number of subcarriers not being equal to a power of 2. In all these cases 4-QAM constellation encoders were used to simulate the constellation encoder module. This means that OFDM symbols were sums of harmonic waves of the same amplitude. FIG. 35 shows PAPR averaged over data sets of different homogeneity, for a chirp with p=1 as a phase shifter, in a 61-carrier communication system. The existing results (Gimlin and Patisaul, 1993; Shlien, 1988) suggest that this phase shifter is the best possible that should yield PAPR of 2.6 dB in the most inhomogeneous data set. This number is confirmed in simulations that yield PAPR of 1.8 which converts into approximately 2.6 dB. However, the results presented in this invention suggest that this phase shifter is not optimal; at q=61 the optimal shifters correspond to even positive p smaller than 122. FIG. 36 shows PAPR for an FSC with p=20 as a phase shifter, in the same system. Comparing these figures shows that this phase shifter outperforms the best conventional one by 2.6 dB at the most inhomogeneous data set yielding PAPR of unity. FIG. 37 shows PAPR averaged over data sets of different homogeneity, for a chirp with p=1 as a phase shifter, in a 63-channel communication system. FIG. 38 shows PAPR for an FSC with p=2 as a phase shifter, in the same system. Again, the proposed phase shifter outperforms the best conventional one by as much as 2.6 dB.

Discussion

The proposed FSC are excellent phase shifters that yield a significant reduction in PAPR. There is additional benefit in using a plurality of FSC instead of just one. In a large network, each node can be assigned a pseudorandom sequence of integers. A node may have a unique sequence assigned to its links, or it may have separate sequences for separate links. Information about these sequences is exchanged between peers at the beginning of a communication session. Subsequent data sequences are phase-shifted with a (p, q)-FSC where p equals a current value from the sequence. Such phase shifters protect the communication security of a link on the physical layer. As they are equivalent performance-wise, combining them does not negatively affect the performance of the system.

Another potential application of FSC is to protect privileged information PAPR-wise. Some information may be so valuable, that the data rate is unimportant in comparison to the absence of transmission errors. In these circumstances, clipping peaks of a signal generated at the transmitter is unacceptable. This can be avoided by temporarily assigning all subcarriers for these data. As a result, each sequence at the output of the encoder module will have identical components while the information may vary between different sequences. Applying FSC to each of these sequences guarantees that the transmission of the privileged data will have the PAPR of unity.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for employing a complex, constant envelope flat spectrum chirp sequence of the length q such that it is mapped by the q-point inverse discrete Fourier transform to another complex, constant envelope sequence comprising:

choosing a number p such that p and q are mutually prime integers having opposite parities;

computing components $z(r)$ of the flat spectrum chirp according to the formula $z(r)=\exp(j*\pi*m*p*r^2/q)$ where $j^2=-1$, r is an integer r such that $0 \leq r < q$; and m equals either 1 or −1 for all r; and reducing the peak-to average power ratio of a complex waveform obtained as the q-point inverse discrete Fourier transform of a complex message of the length q, by means of multiplying the r-th component of said message by the r-th component of said flat spectrum chirp, for integer r such that $0 <= r < q$.

2. The method of claim 1 wherein a plurality of said messages is consecutively retrieved from a data stream; for each message retrieved, parameters of the flat spectrum chirp are determined based on the value of a current element of a pseudorandom sequence; said pseudorandom sequence may be held proprietary by the owner of the data stream for security reasons.

3. The method of claim 1 further comprising restoring said message from said waveform by means of dividing the r-th component of the q-point discrete Fourier transform of the waveform by the r-th component of the flat spectrum chirp, for integer r such that $0 \leq r < q$.

* * * * *